(12) United States Patent
Swatloski et al.

(10) Patent No.: US 9,683,309 B2
(45) Date of Patent: Jun. 20, 2017

(54) PROCESS FOR ELECTROSPINNING CHITIN FIBERS FROM CHITINOUS BIOMASS SOLUTION

(71) Applicant: Board of Trustees of The University of Alabama, Tuscaloosa, AL (US)

(72) Inventors: Richard P. Swatloski, Tuscaloosa, AL (US); Patrick S. Barber, Tuscaloosa, AL (US); Terrance Opichka, Tuscaloosa, AL (US); Jonathan R. Bonner, Brookwood, AL (US); Gabriela Gurau, Tuscaloosa, AL (US); Christopher Scott Griggs, Vicksburg, MS (US); Robin D. Rogers, Tuscaloosa, AL (US)

(73) Assignee: Board of Trustees of The University of Alabama, Tuscaloosa, AL (US)

( * ) Notice: Subject to any disclaimer, the term of this patent is extended or adjusted under 35 U.S.C. 154(b) by 871 days.

(21) Appl. No.: 13/949,501

(22) Filed: Jul. 24, 2013

(65) Prior Publication Data
US 2014/0027938 A1   Jan. 30, 2014

Related U.S. Application Data

(60) Provisional application No. 61/674,979, filed on Jul. 24, 2012.

(51) Int. Cl.
*D01D 1/02*   (2006.01)
*D01D 7/00*   (2006.01)
(Continued)

(52) U.S. Cl.
CPC ............. *D01D 5/003* (2013.01); *C08L 5/08* (2013.01); *D01D 5/0046* (2013.01); *D01F 9/00* (2013.01)

(58) Field of Classification Search
CPC .......... C08L 5/08; D01D 1/02; D01D 5/0046; D01D 7/00; D01F 4/00; D01F 9/00
(Continued)

(56) References Cited

U.S. PATENT DOCUMENTS 3,892,731 A   7/1975   Austin
5,836,970 A   11/1998  Pandit
(Continued)

FOREIGN PATENT DOCUMENTS

EP   0904433 B1   10/2002
JP   2000314035 A   11/2000
(Continued)

OTHER PUBLICATIONS

International Search Report and Written Opinion for Application No. PCT/US2013/051764 dated Oct. 16, 2013.
(Continued)

*Primary Examiner* — Leo B Tentoni
(74) *Attorney, Agent, or Firm* — Meunier Carlin & Curfman LLC

(57) ABSTRACT

Disclosed are methods for electrospinning chitinous biomass solution to form chitin fibers, using ionic liquids or other ion-containing liquids as solvent. Chitin fibers produced thereby and articles containing such chitin fibers are also disclosed. The chitin fiber thus obtained has very high surface area and improved strength over currently commercially available chitin materials.

25 Claims, 3 Drawing Sheets

(51) Int. Cl.
    *D01F 4/00*         (2006.01)
    *D01D 5/00*         (2006.01)
    *C08L 5/08*         (2006.01)
    *D01F 9/00*         (2006.01)

(58) Field of Classification Search
    USPC .......... 264/10, 178 F, 178 R, 183, 184, 186,
                  264/202, 211, 211.12, 464, 465, 466, 484,
                                        264/489; 536/20
    See application file for complete search history.

(56) References Cited

U.S. PATENT DOCUMENTS

| | | | |
|---|---|---|---|
| 6,824,599 | B2 | 11/2004 | Swatloski et al. |
| 6,846,924 | B1 | 1/2005 | Malmgren et al. |
| 2001/0024716 | A1 | 9/2001 | Chen et al. |
| 2002/0056633 | A1* | 5/2002 | Westman ................ B01J 19/00 204/157.6 |
| 2005/0058694 | A1 | 3/2005 | Nielsen |
| 2006/0241287 | A1 | 10/2006 | Hecht et al. |
| 2008/0097001 | A1 | 4/2008 | Miraftab et al. |
| 2009/0010983 | A1 | 1/2009 | Melvik et al. |
| 2009/0099353 | A1 | 4/2009 | Miraftab et al. |
| 2009/0215720 | A1 | 8/2009 | Thibodeau et al. |
| 2009/0221813 | A1* | 9/2009 | Moellmann ............. C08B 1/003 536/85 |
| 2010/0087369 | A1 | 4/2010 | Cutsem et al. |
| 2010/0143435 | A1* | 6/2010 | Dagger ................... A61L 27/18 264/465 X |
| 2010/0239673 | A1* | 9/2010 | Linhardt .............. A61K 9/5192 424/488 |
| 2010/0319862 | A1* | 12/2010 | Rahman ................. D21C 3/20 162/50 |
| 2011/0180951 | A1* | 7/2011 | Teo ...................... D01D 5/0046 264/109 |

FOREIGN PATENT DOCUMENTS

| | | |
|---|---|---|
| WO | 2009/105236 A1 | 8/2009 |
| WO | 2010/141470 A2 | 12/2010 |

OTHER PUBLICATIONS

International Search Report and Written Opinion, dated Aug. 27, 2014, received in connection with International Application No. PCT/US2014/034793.
Non-final Office Action, dated Aug. 13, 2014, received in connection with U.S. Appl. No. 13/375,245.
Bartlett et al., Chitin, Cholera, and Competence, Science, 310:1775-1777 (2005).
Black et al., The estimation of chitin and chitin nitrogenin crawfish waste and derived products, Analyst, 75:185-189 (1950).
Erdmenger et al., Homogeneous tritylation of cellulose in 1-Butyl-3-methylimidazolium chloride, Macromol. Biosci., 7:440-445 (2007).
Fort et al., Can ionic liquids dissolve wood? Processing and analysis of lignocellulosic materials with 1-n-butyl-3-methylimidazolium chloride, Green Chem., 9:63-69 (2007).
Fukaya et al., Superior Solubility of Polysaccharides in Low Viscosity, Polar, and Halogen-Free 1,3-Dialkylimidazolium Formates, Biomacromolecules, 7:3295-3297 (2006).
Hirano et al., An Improved Method for the Preparation of Colloidal Chitin by using Methanesulfonic Acid, Agric. Biol. Chem., 52:2111-2112 (1988).
Kalra et al., Confined assembly of asymmetric block-copolymer nanofibers via multiaxial jet electrospinning, Small, 5:2323-2332 (2009).
Kumar, A review of chitin and chitosan applications, React. Funct. Polym., 46:1-27 (2000).
Loupy et al., New solvent-free organic synthesis using focused microwave, Synthesis, pp. 1213-1234 (1998).
Mingos, Microwaves in Chemical Syntheses, Chem. Indus., pp. 596-599 (1994).
Percot et al., Optimization of Chitin Extraction from Shrimp Shells, Biomacromolecules, 4:12-18 (2003).
Prasad et al., Weak gel of chitin with ionic liquid, 1-allyl-3-methylimidazolium bromide, Int. J. Biol. Macromol., 45:221-225 (2009).
Qin et al., Dissolution or extraction of crustacean shells using ionic liquids to obtain high molecular weight purified chitin and direct production of chitin films and fibers, Green Chem., 12:968-971 (2010).
Remsing et al., Mechanism of cellulose dissolution in the ionic liquid 1-n-butyl-3-methylimidazolium chloride: a13C and 35/37Cl NMR relaxation study on model systems, Chem. Commun., pp. 1271-1273 (2006).
Rodde et al., A seasonal study of the chemical composition and chitin quality of shrimp shells obtained from northern shrimp (*Pandalus borealis*), Carbohydr. Polym., 71:388-393 (2008).
Rogers et al., Ionic Liquids—Solvents of the Future? Science, 302:792-793 (2003).
Rutherford et al., Proceedings of the First International Conference on Chitin/Chitosan, ed. Muzzarelli and Pariser, MIT Sea Grant Report, MITSG 78-7, pp. 182-192 (1978).
Shigemasa et al., Chemical modification of chitin and chitosan 1: preparation of partially deacetylated chitin derivatives via a ring-opening reaction with cyclic acid anhydrides in lithium chloride/N,N-dimethylacetamide, Carbohydr. Polym., 39:237-243 (1999).
Strauss, Invited Review. A combinatorial approach to the development of environmentally benign organic chemical preparations, Aust. J. Chem., 52:83-96 (1999).
Sun et al., Complete dissolution and partial delignification of wood in the ionic liquid 1-ethyl-3-methylimidazolium acetate, Green Chem., 11:646-655 (2009).
Sun et al., Magnetite-embedded cellulose fibers prepared from ionic liquids, J. Mater. Chem., 18:283-290 (2008).
Swatloski et al., Dissolution of cellose with ionic liquids, J. Am. Chem. Soc., 124:4974-4975 (2002).
Synowiecki et al., Production, Properties, and Some New Applications of Chitin and Its Derivatives, Crit. Rev. Food Sci. Nut., 43(2):145-171 (2003).
Tokura et al., Studies on Chitin. III. Preparation of Chitin Fibers, Polym. J., 11(10):781-786 (1979).
Wu et al., A novel biomass-ionic liquid platform for the utilization of native chitin, Polymer, 49:2321-2327 (2008).
Xie et al., Chitin and chitosan dissolved in ionic liquids as reversible sorbents of $CO_2$, Green Chem., 8:630-633 (2006).
Yamazaki et al., An acidic cellulose—chitin hybrid gel as novel electrolyte for an electric double layer capacitor, Electrochem. Commun., 11:68-70 (2009).

* cited by examiner

PROCESS FOR ELECTROSPINNING CHITIN FIBERS FROM CHITINOUS BIOMASS SOLUTION

CROSS-REFERENCE TO PRIORITY APPLICATION

This application claims the benefit of priority to U.S. Provisional Application No. 61/674,979, filed Jul. 24, 2012, which is incorporated herein by reference in its entirety.

STATEMENT REGARDING FEDERALLY SPONSORED RESEARCH

This invention was made with Government Support under Grant 00120427 awarded by the U.S. Department of Energy Nuclear Energy University Program. The Government has certain rights in the invention.

FIELD

This disclosure generally relates to methods for electrospinning chitin fibers from chitinous biomass solution, using ionic liquids or other ion-containing liquids as solvent. Chitin fibers produced thereby and articles containing such chitin fibers are also disclosed.

BACKGROUND

Chitin, a linear amino polysaccharide composed of β-(1→4)-linked 2-acetamido-2-deoxy-β-D-glucose units found in the outer skeleton of arthropods, is the second most plentiful natural polymer after cellulose (Bartlett et al., *Science*, 310: 1775-1777 (2005)). Its bioactivity, biocompatibility, and low toxicity make it suitable for controlled drug release formulations, cosmetics, food preservation, fertilizers, or biodegradable packaging materials, while its ability to absorb both metal ions and hydrophobic organic compounds make it useful in waste water processing and other industrial applications (Synowiecki et al., *Crit. Rev. Food Sci. Nutr.*, 43:145-171 (2003) and Kumar, *React. Funct. Polym.*, 46:1-27 (2000)). However, due to its high density of hydrogen bonds, chitin is completely insoluble in water, most organic solvents, dilute acidic solutions, and dilute basic solutions. Thus, various chemical modifications have been applied to make chitin more easily soluble, including N-deacetylation to form chitosan (Sashiwa et al., *Carbohydr. Polym.*, 39:127-138 (1999)).

Chitin can be obtained commercially in pure grade or practical grade (PG-chitin). PG-chitin is primarily produced from crustacean shells by a chemical method that involves acid demineralization of the shell, followed by removal of shell proteins by alkali treatment, and then decolorization (Percot et al., *Biomacromolecules*, 4:12-18 (2003)). It can be further purified by methanesulfonic acid treatment to obtain pure chitin (Hirano and Nagao, *Agric. Biol. Chem.*, 52:2111-2112 (1988)). But even though the current industrialized chemical process isolates chitin efficiently, the chitin molecular weight (MW) is reduced during processing (Synowiecki et al., *Crit. Rev. Food Sci. Nutr.*, 43:145-171 (2003)). A less chemical- and energy intensive process for obtaining the chitin, and a purer, higher molecular weight chitin product is desirable for many applications including fiber spinning.

Chitin is known to form microfibrillar arrangements in living organisms, and the presence of microfibrils suggests that chitin should be a good candidate for fiber spinning (see U.S. Pat. No. 3,892,731). However, only a few papers describing the spinning of chitin fibers have been reported, mainly due to the limited number of solvent systems which can readily dissolve chitin in sufficient quantity and with appropriate rheology for spinning Thus, producing chitin fibers or even films continues to be a challenge in chitin research.

In most cases where chitin fibers have been produced, commercial chitin powder has been used with solvent systems such as (1) halogenated solvents (e.g., trichloroacetic acid (TCA), dichloroacetic acid (DCA), or formic acid-DCA mixtures, or (2) amide-LiCl systems (e.g., N,N-dimethylacetamide (DMAc)-5% LiCl) (see U.S. Pat. No. 3,892,731; Tokura et al., *Polym. J.*, 11:781-786 (1979); and Rutherford and Austin in *Proceedings of the First International Conference on Chitin/Chitosan*, ed. Muzzarelli and Parises, MIT Sea Grant Report, MIT SG 78-7, 1978, pp. 182-192). The drawbacks of these methods include the use of corrosive chemicals that can degrade the polymer upon even short exposures and difficulties in the complete removal and recovery of the solvent from the fiber. An environmentally-benign solvent that could readily solubilize chitin or even crustacean shells without derivatization would be greatly beneficial in this arena.

Crustacean shells (e.g., shrimp shells) contain not only chitin, but also large amounts of protein, mineral salts, and a small amount of lipids. Thus, crustacean shells are even harder to dissolve than either PG-chitin or pure (native) chitin. Thus, what are still needed are new solvents and methods for forming fibers and other structures from chitin obtained directly from a chitinous biomass such as crustacean shells. The subject matter disclosed herein addresses these and other needs.

SUMMARY

In accordance with the purposes of the disclosed materials, compounds, compositions, articles, devices, and methods, as embodied and broadly described herein, the disclosed subject matter, in one aspect, relates to methods for extracting chitin from chitinous biomass using ionic liquids or other ion-containing liquids and electrospinning the chitin into fibers. In some aspects, the methods include extracting chitin from the exoskeletons of crustaceans, such as shellfish, using ionic liquids or other ion-containing liquids and electrospinning the chitin into fibers. In other aspects, the methods include forming non-woven articles from the electrospun chitin fibers and to the fibers and articles obtained thereby.

In a first aspect, the present disclosure relates to a method of forming chitin fibers from a chitinous biomass. The method comprises dissolving at least a portion of the chitinous biomass in an ionic liquid or ion-containing solvent to form a mixture; electrospinning the mixture into a non-solvent to form the chitin fibers, and collecting the chitin fibers from the non-solvent. The dissolving step comprises heating the chitinous biomass in the ionic liquid or ion-containing solvent to form the mixture. In some embodiments, the dissolving step comprises microwave irradiating the chitinous biomass in the ionic liquid or ion-containing solvent to form the mixture. In some embodiments, the microwave frequency is 2.45 GHz. In some embodiments, the microwave frequency is less than 1.0 GHz, for example, 915 MHz. In some embodiments, the microwave frequency is continuous. The microwave irradiation is conducted in multiple pulses for a given total duration of irradiation time with optional stirring between the pulses. The microwave irradiation is conducted with 1-30 second pulses for a total of 1-30 min irradiation time with stirring between the pulses. In one embodiment, the microwave irradiation is conducted with 3 second pulses for a total of about 2 min irradiation time with stirring between the pulses. The chitinous biomass is a crustacean biomass, for example the exoskeleton of the group consisting of crab, shrimp, lobster, and crayfish. The chitin is present in the mixture at from about 0.5 to about 5 wt. % of the mixture, for example, from about 0.5 to about 3 wt. % of the mixture. In some embodiments, the method further comprises maintaining the mixture at an elevated temperature before electrospinning the mixture. In some embodiments, the ionic liquid or ion-containing solvent used in the method contains an imidazolium cation such as a 1-alkyl-3-methylimidazolium halide or a 1-alkyl-3-methylimidazolium $C_{1-6}$ carboxylate. In one embodiment, the ionic liquid used is 1-ethyl-3-methylimidazoium chloride or 1-butyl-3-methylimidazolium chloride. In another embodiment, the ionic liquid used is selected from the group consisting of 1-ethyl-3-methylimidazolium acetate, 1,3-diethylimdazolium acetate, and 1,3-dimethylimidzaolium acetate. In some embodiment, the non-solvent used in the method is water, a $C_1$-$C_4$ alcohol, ketone, or a mixture thereof. In some embodiments, the method further comprises recovering the ionic liquid from the non-solvent. In some embodiments, the electrospinning is performed at a potential of from about 5 kV to about 45 kV and at a flow rate of from about 3 mL/h to about 20 mL/h. The mixture formed for electrospinning has a relative viscosity of about 1 to about 1.5 at 35° C. In some embodiments, the method further comprises adding a processing aid to the ionic liquid or ion-containing solvent so the chitin is present in the mixture at from about 0.5 to about 15 wt. % of the mixture. In some embodiments, the method further comprises dissolving the chitin fiber in an ionic liquid or ion-containing solvent to form a reconstitution mixture and electrospinning the reconstitution mixture into a non-solvent to form reconstituted chitin fibers and collecting the reconstituted chitin fibers from the non-solvent. The present disclosure also relates to a chitin fiber prepared according to the methods disclosed herein. The present disclosure additionally relates to an article comprising the chitin fibers disclosed herein.

In another aspect, the present disclosure relates to a fiber comprising at least 80% chitin and having a surface area of 10 $m^2$/g to 1000 $m^2$/g. In some embodiments, the fiber has an ultimate stress measurement of at least 120 MPa. In some embodiments, the fiber has an ultimate stress of at least 200 MPa.

Additional advantages of the disclosed subject matter will be set forth in part in the description that follows, and in part will be obvious from the description, or can be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE FIGURES

The accompanying figures, which are incorporated in and constitute a part of this specification, illustrate several aspects described below.

DETAILED DESCRIPTION

Figure 1:
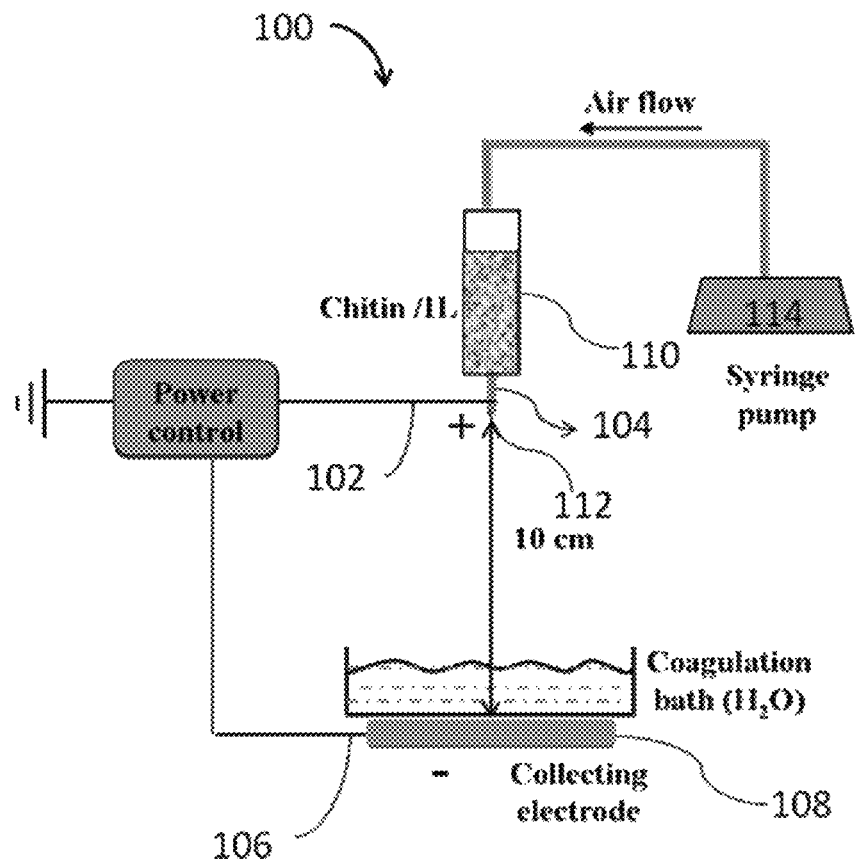
FIG. 1 is a schematic representation of electrospinning chitin from an IL solution.

The materials, compounds, compositions, and methods described herein may be understood more readily by reference to the following detailed description of specific aspects of the disclosed subject matter and the Examples included therein and to the Figures.

Before the present materials, compounds, compositions, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

GENERAL DEFINITIONS

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "a polymer" includes mixtures of two or more such polymers, reference to "the component" includes mixtures of two or more such component, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valencies of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc.

"$A^1$," "$A^2$," "$A^3$," and "$A^4$" are used herein as generic symbols to represent various specific substituents. These symbols can be any substituent, not limited to those disclosed herein, and when they are defined to be certain substituents in one instance, they can, in another instance, be defined as some other substituents.

The term "alkyl" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, nonyl, decyl, dodecyl, tetradecyl, hexadecyl, eicosyl, tetracosyl, and the like. The alkyl group can also be substituted or unsubstituted. The alkyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

The term "aryl" as used herein is a group that contains any carbon-based aromatic group including, but not limited to, benzene, naphthalene, phenyl, biphenyl, phenoxybenzene, and the like. "Heteroaryl" is defined as a group that contains an aromatic group that has at least one heteroatom incorporated within the ring of the aromatic group. Examples of heteroatoms include, but are not limited to, nitrogen, oxygen, sulfur, and phosphorus. Likewise, the term "non-heteroaryl," which is included in the term "aryl," defines a group that contains an aromatic group that does not contain a heteroatom. The aryl and heteroaryl groups can be substituted or unsubstituted. The aryl and heteroaryl groups can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein. The term "biaryl" is a specific type of aryl group and is included in the definition of aryl. Biaryl refers to two aryl groups that are bound together via a fused ring structure, as in naphthalene, or are attached via one or more carbon-carbon bonds, as in biphenyl.

The term "cyclic group" is used herein to refer to either aryl groups, non-aryl groups (i.e., cycloalkyl, heterocycloalkyl, cycloalkenyl, and heterocycloalkenyl groups), or both. Cyclic groups have one or more ring systems that can be substituted or unsubstituted. A cyclic group can contain one or more aryl groups, one or more non-aryl groups, or one or more aryl groups and one or more non-aryl groups.

The terms "amine" or "amino" as used herein are represented by the formula $NA^1A^2A^3$, where $A^1$, $A^2$, and $A^3$ can be, independently, hydrogen, an alkyl, halogenated alkyl, alkenyl, alkynyl, aryl, heteroaryl, cycloalkyl, cycloalkenyl, heterocycloalkyl, or heterocycloalkenyl group described above.

The term "carboxylic acid" as used herein is represented by the formula —C(O)OH. A "carboxylate" as used herein is represented by the formula —C(O)O$^-$. An acetate or (OAc) is $CH_3C(O)O^-$. Throughout the specification C(O) is used as an abbreviation for a carbonyl group.

The term "halide" as used herein refers to the halogens fluorine, chlorine, bromine, and iodine.

"$R^1$," "$R^2$," "$R^3$," "$R^n$," where n is an integer, as used herein can, independently, possess one or more of the groups listed above. For example, if $R^1$ is a straight chain alkyl group, one of the hydrogen atoms of the alkyl group can optionally be substituted with a hydroxyl group, an alkoxy group, an alkyl group, a halide, and the like. Depending upon the groups that are selected, a first group can be incorporated within second group or, alternatively, the first group can be pendant (i.e., attached) to the second group. For example, with the phrase "an alkyl group comprising an amino group," the amino group can be incorporated within the backbone of the alkyl group. Alternatively, the amino group can be attached to the backbone of the alkyl group. The nature of the group(s) that is (are) selected will determine if the first group is embedded or attached to the second group.

Unless stated to the contrary, a formula with chemical bonds shown only as solid lines and not as wedges or dashed lines contemplates each possible isomer, e.g., each enantiomer and diastereomer, and a mixture of isomers, such as a racemic or scalemic mixture.

The term "ion pair" is a positive ion (i.e., cation) and a negative ion (i.e., anion) that are temporarily bonded together by an attractive force (i.e., electrostatic, van-der-Waals, ionic).

The term "ionic liquid" describes a salt with a melting point below about 150° C. (e.g., below about 125, 100, 75, 50, or 25° C.) whose melt is composed of discrete ions.

The term "hydrogen bond" describes an attractive interaction between a hydrogen atom from a molecule or molecular fragment X—H in which X is more electronegative than H, and an atom or a group of atoms in the same or different molecule, in which there is evidence of bond formation. The hydrogen bond donor can be a cation and the hydrogen bond acceptor can be an anion.

The term "co-crystal" describes a crystalline structure made up of two or more atoms, ions, or molecules that exist in a definite stoichiometric ratio. Generally, a co-crystal is comprised of two or more components that are not covalently bonded and instead are bonded via van-der-Waals interactions, ionic interactions or via hydrogen bonding.

The term "complex" describes a coordination complex, which is a structure comprised of a central atom or molecule that is weakly connected to one or more surrounding atoms or molecules, or describes chelate complex, which is a coordination complex with more than one bond.

The term "eutectic" is a mixture of two or more ionic liquids, ionic liquids and neutral compounds, ionic liquids and charge compounds, ionic liquids and complexes, ionic liquids and ion pairs, or two or more ion pairs that have at least one component in common.

The term ion-containing liquid is used herein to collectively refer to either an ion pair, co-crystal, or eutectic.

Reference will now be made in detail to specific aspects of the disclosed materials, compounds, compositions, articles, and methods, examples of which are illustrated in the accompanying Examples.

Certain materials, compounds, compositions, and components disclosed herein can be obtained commercially or readily synthesized using techniques generally known to those of skill in the art. For example, the starting materials and reagents used in preparing the disclosed compounds and compositions are either available from commercial suppliers such as Aldrich Chemical Co., (Milwaukee, Wis.), Acros Organics (Morris Plains, N.J.), Fisher Scientific (Pittsburgh, Pa.), or Sigma (St. Louis, Mo.) or are prepared by methods known to those skilled in the art following procedures set forth in references such as Fieser and Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991); March's Advanced Organic Chemistry, (John Wiley and Sons, 4th Edition); and Larock's Comprehensive Organic Transformations (VCH Publishers Inc., 1989).

Also, disclosed herein are materials, compounds, compositions, and components that can be used for, can be used in conjunction with, can be used in preparation for, or are products of the disclosed methods and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. For example, if a composition is disclosed and a number of modifications that can be made to a number of components of the composition are discussed, each and every combination and permutation that are possible are specifically contemplated unless specifically indicated to the contrary. Thus, if a class of components A, B, and C are disclosed as well as a class of components D, E, and F and an example of a composition A-D is disclosed, then even if each is not individually recited, each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to, steps in methods of making and using the disclosed compositions. Thus, if there are a variety of additional steps that can be performed it is understood that each of these additional steps can be performed with any specific aspect or combination of aspects of the disclosed methods, and that each such combination is specifically contemplated and should be considered disclosed.

Materials and Methods

Disclosed herein, in one aspect, are methods for the direct dissolution of chitinous biomass (e.g., crustacean shells) using ionic liquids or other ion-containing liquids and electrospinning the chitin into fibers. For example, disclosed are ionic liquids that can be useful in extracting chitin from a chitinous biomass and also in electrospinning fibers of chitin directly from the solution. The dissolution of chitin can be facilitated by microwave irradiation. In a further aspect, methods of solution processing the extracted chitin to produce nanofiber mats of chitin are disclosed. In addition, methods of recovering the ionic liquids used in the methods described herein are also provided.

Ionic liquids (ILs) are known to efficiently dissolve cellulose and other natural biomaterials such as wood, which contains hemicelluloses and lignin, beside cellulose (see, for example, Swatloski et al., J. Am. Chem. Soc., 124:4974-4975 (2002); Fort et al., Green Chem., 9:63-69 (2007); and Sun et al., Green Chem., 11:646-655 (2009)). Chitin can be described as cellulose where one hydroxyl group on each glucose monomer is replaced by an acetylamine group. This difference allows for increased hydrogen bonding between adjacent polymeric chitin chains, and thus chitin is even more difficult to dissolve than cellulose (Wu et al., Polymer, 49: 2321-2327 (2008)). There have, however, been some reports of pure chitin dissolved in ILs. Xie et al. reported that 1-butyl-3-methylimidazolium chloride ([C4mim]Cl) can dissolve pure chitin and chitosan with solubilities of ca. 10 wt % in 5 h at 110° C., and Yamazaki et al. obtained similar solubilities with 1-allyl-3-methylimidazolium bromide [Amim]Br at 100° C. for 24 h (See Xie et al., Green Chem., 8:630-633 (2006) and Yamazaki et al., Electrochem. Commun., 11:68-70 (2009)). Wu et al. reported using the acetate salt [$C_4$mim]OAc to dissolve 'native' chitin with 3-7 wt % solubility at 110° C. (Wu et al., Polymer, 49: 2321-2327 (2008)). (Native chitin can also be classified as 'pure' chitin with chitin content of 94.7-96.4%.)

Crustacean shells (e.g., shrimp shells) contain not only chitin, but also large amounts of protein, mineral salts, and a small amount of lipids. Thus, crustacean shells are even harder to dissolve than either PG-chitin or pure (native) chitin. This was recently addressed, however, by Qin, Rogers, and Daly, who discovered a process for dissolving chitin directly from chitinous biomass, e.g., crustacean shells, by using various ILs (see WO2010/141470, which is incorporated by reference herein in its entirety for its teaching of chitin dissolution, regeneration, and processing using ILs). The authors also discovered that their methods resulted in high molecular weight chitin, which can lead to strong fibers and other materials. However, the high molecular weight chitin obtained by these methods can sometimes present challenges for efficient fiber creation and for the production of non-woven materials.

Disclosed herein, in certain aspects, is a method of forming chitin fibers from a chitinous biomass that comprises dissolving at least a portion of the chitinous biomass in an ionic liquid or ion-containing solvent to form a mixture; electrospinning the mixture into a non-solvent, and collecting chitin fibers from the non-solvent.

Chitinous Biomass

Chitinous biomass is a mixture obtained from and containing the exoskeletons of crustaceans (e.g., crab, shrimp, lobster, and crayfish). Chitinous biomass comprises chitin, a naturally occurring N-acetyl-D-glucosamine polymer, which has a similar structure to cellulose. These sources of chitinous biomass are suitable for use in the methods and compositions disclosed herein.

The chitinous biomass can be mixed directly with an ionic liquid or ion-containing solvent to extract the chitin. Thus, disclosed are compositions comprising chitinous biomass and one or more ionic liquids. For example, disclosed are compositions comprising an exoskeleton and one or more ionic liquids. Also disclosed are methods for dissolving chitinous biomass (e.g., an exoskeleton) in one or more ionic liquids. In this aspect, the chitinous biomass used can be treated, derivatized, and/or otherwise processed. As described above, exoskeletons include chitin. Exoskeletons can further include additional components, such as proteins, lipids, and salts.

Chitinous biomass is distinguished herein from pure (native) or practical grade chitin. Chitin derived from crustaceans is available from suppliers as "pure chitin" and as "practical grade chitin." However, these forms of chitin are prepared through a process similar to the Kraft Process for obtaining cellulose from wood or other sources of cellulose. During the process of preparing pure chitin and practical grade chitin, there is a breakdown of the polysaccharide chains such that the resulting chitin has a shorter chain length and therefore a lower average molecular weight than it had before it was processed. The disclosed processes provide a method of directly extracting chitin from a chitinous biomass into a mixture solution without substantially shortening the polysaccharide chains and subsequent electrospinning of the chitin solution mixture into chitin fiber. As such, the films, fibers, and beads formed from the disclosed process wherein the chitin is directly extracted from the chitinous biomass provides a method for obtaining polymeric materials comprising chitin that has nearly the original full polysaccharide chain length and molecular weight. Moreover the disclosed chitin can be substantially free of agents that are typically found in pure and practical grade chitin, such as methanesulfonic acid, trichloroacetic acid, dichloroacetic acid, formic acid, and dimethylacetamide.

Ionic Liquids

ILs are useful in processes due to their non-volatility, solubilizing properties, recycling ability, and ease of processing (Rogers and Seddon, *Science* 2003, 302:792). ILs can often be viable alternatives to traditional industrial solvents comprising volatile organic compounds (VOCs). In particular, the use of ILs can substantially limit the amount of organic contaminants released into the environment. As such, ILs are at the forefront of a growing field known as "green chemistry."

The ILs suitable for use in the disclosed methods and compositions comprise ionized species (i.e., cations and anions) and have melting points below about 150° C. For example, the ILs can be liquid at or below a temperature of about 150° C., about 100° C., or about 85° C., and at or above a temperature of about minus 100° C. or about minus 44° C. In some examples, a suitable IL can be liquid (molten) at a temperature of about minus 10° C. to about 150° C., about minus 4° C. to about 100° C., or about 25° C. to about 85° C. The term "liquid" describes a generally amorphous, non-crystalline, or semi-crystalline state. For example, while some structured association and packing of cations and anions can occur at the atomic level, an IL can have minor amounts of such ordered structures and are therefore not crystalline solids. The ILs can be fluid and free-flowing liquids or amorphous solids such as glasses or waxes at temperatures at or below about 150° C. In particular examples described herein, the ILs are liquid at the temperature at which they are applied or used.

ILs suitable for use herein can be hydrophilic or hydrophobic and can be substantially free of water, substantially free of alcohol-miscible organic solvent, and/or nitrogen-comprising base. By "substantially free" is meant less than about 5 wt. %, e.g., less than about 4, 3, 2, or 1 wt. % of the identified component. Contemplated organic solvents of which the ionic liquid can be substantially free of include solvents such as dimethyl sulfoxide, dimethyl formamide, acetamide, hexamethyl phosphoramide, water-soluble alcohols, ketones or aldehydes such as ethanol, methanol, 1- or 2-propanol, tert-butanol, acetone, methyl ethyl ketone, acetaldehyde, propionaldehyde, ethylene glycol, propylene glycol, the $C_1$-$C_4$ alkyl and alkoxy ethylene glycols and propylene glycols such as 2-methoxyethanol, 2-ethoxyethanol, 2-butoxyethanol, diethyleneglycol, and the like.

It should be appreciated that some water may be present in the ILs (and ion containing solvents) during use since the chitinous biomass is often only partially dry. Such residual amounts should be taken into account even though a system is described to be "substantially free of" water. The same meaning is intended regarding the presence of a nitrogen-comprising base, alcohol, or other miscible organic solvent.

In other examples, the IL can contain processing aids (as discussed elsewhere herein) to assist in chitin dissolution. These processing aids can be used in amounts up to 50% by weight of the IL. The processing aids can be used to modify the viscosity and/or melting point of the IL, and/or to improve the solubility of the chitin. Processing aids can also be used to improve the precipitation and removal of various undesired components like cellular debris, lipids, proteins, mineral salts, and the like. Examples of processing aids suitable for use herein include the organic solvents mentioned below and water.

Some specific examples of ILs that can be used in the methods herein are disclosed in Qin et al., WO2010/141470, entitled "Process for forming films, fibers, and beads, from Chitinous Biomass"; Xie et al., "Chitin and chitosan dissolved in ionic liquids as reversible sorbents of $CO_2$," *Green Chem* 8:630-633 (2006); Prasad et al., "Weak gel of chitin with ionic liquid, 1-allyl-3-methylimidazolium bromide," *Int J Biol Macromol* 45:221-225 (2009); and Qin et al., "Dissolution or extraction of crustacean shells using ionic liquids to obtain high molecular weight purified chitin and direct production of chitin films and fibers," *Green Chem* 12:968-971 (2010), which are each incorporated by reference herein for their teachings of ILs. Other examples of suitable ILs that can be used herein are disclosed in U.S. Pat. No. 6,824,599 and Swatloski et al., *J Am Chem Soc* 2002, 124:4974-4975, which are incorporated by reference herein for their teachings of ILs. Other specific examples of suitable ILs are disclosed herein.

In other methods the IL can actually be a mixture of ILs, prepared by reacting IL precursors in one-port to form the ILs. An IL precursor is a compound that can form any of the cations or anions disclosed herein. In this sense the ILs can be crude mixtures, containing different types of cations and/or different types of anions, and some organic or water solvent. The use of crude IL mixtures to dissolve polymers is taught in WO2011/056924, which is incorporated by reference herein in its entirety for its teachings of polymer dissolution.

Ion-Containing Solvents

Also disclosed herein is the use of ion-containing solvents to dissolve chitin from the chitinous biomass. The ion-containing solvents can comprise ion pairs, eutectics, or liquid co-crystals. Such solvents comprise cations and anions.

Cations

As noted, ILs and ion-containing solvents contain one or more types of cations and one or more types of anions. While specific ILs are discussed above and elsewhere herein, other ILs can be used by combining the various cations and anions that follow. But depending on the particular ion and ratios thereof, the resulting product can be an IL or an ion-containing solvent (i.e., eutectic, ion pair, or liquid co-crystal), any of which can be suitable for use in the disclosed methods.

In many examples, the cation can comprise a linear, branched, or cyclic heteroalkyl unit. The term "heteroalkyl" refers to a cation as disclosed herein comprising one or more heteroatoms chosen from nitrogen, oxygen, sulfur, boron, or phosphorous capable of forming a cation. The heteroatom can be a part of a ring formed with one or more other heteroatoms, for example, pyridinyl, imidazolinyl rings, that can have substituted or unsubstituted linear or branched alkyl units attached thereto. In addition, the cation can be a single heteroatom wherein a sufficient number of substituted or unsubstituted linear or branched alkyl units are attached to the heteroatom such that a cation is formed. For example, the cation $C_n$ alkyl-methylimidazolium [$C_n$mim] where n is an integer of from 1 to 8 can be used. Preferably, the cation $C_{1-4}$ alkyl-methylimidazolium [$C_{1-4}$mim] can be used. [Amim] is an allyl methylimidazolium ion and is suitable for use herein. [$C_2C_2$Im] is diethylimidazolium ion and is suitable for use herein. [$C_2C_1$Im] or [$C_2$mim] is 1-ethyl-3-methyl-imidazolium ion and is suitable for use herein.

Other non-limiting examples of heterocyclic and heteroaryl units that can be alkylated to form cationic units include imidazole, pyrazoles, thiazoles, isothiazoles, azathiozoles, oxothiazoles, oxazines, oxazolines, oxazaboroles, dithiozoles, triazoles, selenozoles, oxahospholes, pyrroles, boroles, furans, thiphenes, phospholes, pentazoles, indoles, indolines, oxazoles, isothirazoles, tetrazoles, benzofurans, dibenzofurans, benzothiophenes, dibenzothoiphenes, thiadiazoles, pyrdines, pyrimidines, pyrazines, pyridazines, piperazines, piperidines, morpholines, pyrans, annolines, phthalazines, quinazolines, and quinoxalines.

The following are examples of heterocyclic units that are suitable for forming a cyclic heteroalkyl cation unit of suitable ILs or ion-containing solvents.

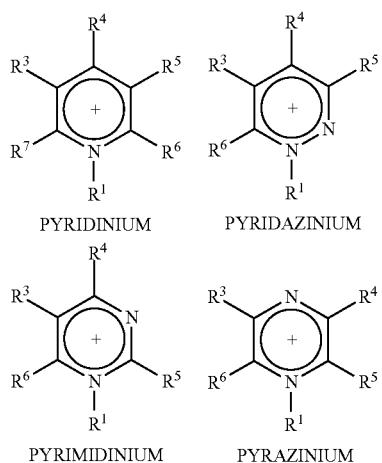

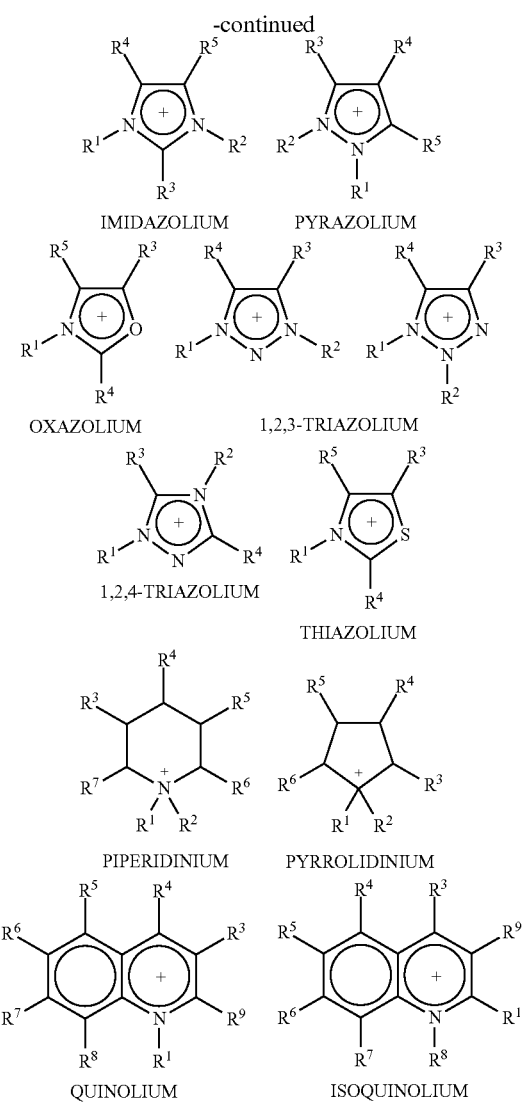

wherein $R^1$ and $R^2$ are independently a $C_1$-$C_6$ alkyl group or a $C_1$-$C_6$ alkoxyalkyl group, and $R^3$, $R^4$, $R^5$, $R^6$, $R^7$, $R^8$, and $R^9$ ($R^3$-$R^9$), when present, are independently H, a $C_1$-$C_6$ alkyl, a $C_1$-$C_6$ alkoxyalkyl group, or a $C_1$-$C_6$ alkoxy group. In other examples, both $R^1$ and $R^2$ groups are $C_1$-$C_4$ alkyl, with one being methyl, and $R^3$-$R^9$, when present, are H. Exemplary $C_1$-$C_6$ alkyl groups and $C_1$-$C_4$ alkyl groups include methyl, ethyl, propyl, iso-propyl, butyl, sec-butyl, iso-butyl, pentyl, iso-pentyl, hexyl, 2-ethylbutyl, 2-methylpentyl, and the like. Corresponding $C_1$-$C_6$ alkoxy groups comprise the above $C_1$-$C_6$ alkyl group bonded to an oxygen atom that is also bonded to the cation ring. An alkoxyalkyl group comprises an ether group bonded to an alkyl group, and here comprises a total of up to six carbon atoms. It is to be noted that there are two isomeric 1,2,3-triazoles. In some examples, all R groups not required for cation formation can be H.

The phrase "when present" is often used herein in regard to substituent R group because not all cations have all of the numbered R groups. All of the contemplated cations comprise at least four R groups, which can, in various examples, be H.

In one example, all R groups that are not required for cation formation; i.e., those other than $R^1$ and $R^2$ for compounds other than the imidazolium, pyrazolium, and triazolium cations shown above, are H. Thus, the cations shown above can have a structure that corresponds to a structure shown below, wherein $R^1$ and $R^2$ are as described before.

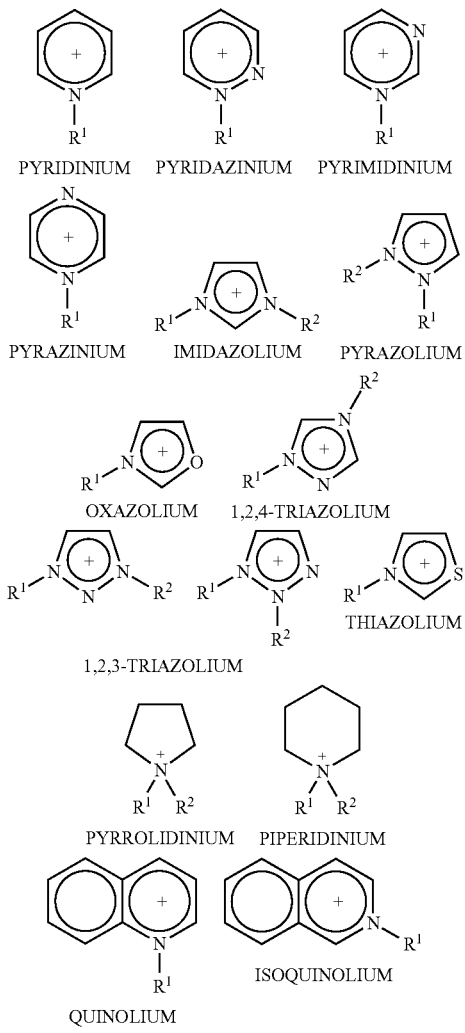

A cation that comprises a single five-membered ring that is free of fusion to other ring structures is also a suitable cation for the compositions and methods disclosed herein.

In additional examples, a suitable cation can correspond in structure to a formula shown below:

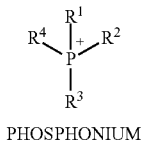

PHOSPHONIUM wherein $R^1$, $R^2$, $R^3$, and $R^4$, when present, are independently a $C_1$-$C_{18}$ alkyl group or a $C_1$-$C_{18}$ alkoxyalkyl group.

Still further examples of suitable cations include ammonium, alkoxyalkyl imidazolium, alkanolyl substituted ammonium, alkoxyalkyl substituted ammonium, aminoalkyl substituted ammonium.

Anions

The choice of the anion can be particularly relevant to the rate and level of chitin dissolution. While not wishing to be bound by theory, the primary mechanism of solvation of polysaccharides by an IL or ion-containing solvent is the anion's ability to break the extensive hydrogen-bonding networks by specific interactions with hydroxyl groups. Thus, it is believed that that the dissolution of chitin is enhanced by increasing the hydrogen bond acceptance and basicity of the anion. Anions that lower the hydrogen bond basicity (i.e., that add hydrogen bond donors) in too great of an excess should be avoided. Anions that also form less viscous ILs or ion-containing liquids are also preferred.

Accordingly, preferred anions are substituted or unsubstituted acyl units $R^{10}CO_2$, for example, formate $HCO_2$, acetate $CH_3CO_2$, proprionate, $CH_3CH_2CO_2$, butyrate $CH_3CH_2CH_2CO_2$, and benzylate, $C_6H_5CO_2$; substituted or unsubstituted sulfates: $(R^{10}O)S(=O)_2O$; substituted or unsubstituted sulfonates $R^{10}SO_3$, for example $(CF_3)SO_3$; substituted or unsubstituted phosphates: $(R^{10}O)_2P(=O)O$; and substituted or unsubstituted carboxylates: $(R^{10}O)C(=O)O$. Non-limiting examples of $R^{10}$ include hydrogen; substituted or unsubstituted linear, branched, and cyclic alkyl; substituted or unsubstituted linear, branched, and cyclic alkoxy; substituted or unsubstituted aryl; substituted or unsubstituted aryloxy; substituted or unsubstituted heterocyclic; substituted or unsubstituted heteroaryl; acyl; silyl; boryl; phosphino; amino; thio; and seleno. In preferred examples, the anion is $C_{1-6}$ carboxylate. Carboxylate anions that contain 1-6 carbon atoms ($C_1$-$C_6$ carboxylate) and are illustrated by formate, acetate, propionate, butyrate, hexanoate, maleate, fumarate, oxalate, lactate, pyruvate, and the like.

Other suitable anions are halogen (fluoride, chloride, bromide, or iodide), perchlorate, a pseudohalogen such as thiocyanate and cyanate, or $C_1$-$C_6$ carboxylate. Pseudohalides are monovalent and have properties similar to those of halides (Schriver et al., Inorganic Chemistry, W. H. Freeman & Co., New York, 1990, 406-407). Pseudohalides include the cyanide ($CN^-$), thiocyanate ($SCN^-$), cyanate ($OCN^-$), fulminate ($CNO^-$), and azide ($N_3^-$) anions. Still other examples of suitable anions are persulfate, sulfate, sulfites, phosphates (e.g., $(CH_3)_2PO_4$), phosphites, nitrate, nitrites, hypochlorite, chlorite, perchlorate, bicarbonates, and the like, including mixtures thereof.

Still further examples of suitable anions are deprotonated amino acids, for example, Isoleucine, Alanine, Leucine, Asparagine, Lysine, Aspartic Acid, Methionine, Cysteine, Phenylalanine, Glutamic Acid, Threonine, Glutamine, Tryptophan, Glycine, Valine, Proline, Selenocysteine, Serine, Tyrosine, Arginine, Histidine, Ornithine, Taurine.

It is also contemplated that other anions, though not preferred, can still be used in some instances. However, in these instances, higher concentrations, longer mixing times, and higher temperatures can be required. One can use $CO_3^{2-}$; $NO_2^-$, $NO_3^-$, $SO_4^{2-}$, $CN^-$, arsenate(V), $AsX_6$; $AsF_6$, and the like; stibate(V) (antimony), $SbX_6$; $SbF_6$, and the like.

Processing Aids

Processing aids can be added to the IL or ion-containing solvent in order to help lower the cost, lower the viscosity, aid in recycling, stiochiometrically or nonstoichiometrically interact with chitin and other components to increase dissolution, facilitate disintegration, cleave bonds, and for derivatization and other treatments. Any processing aid can be used in these methods as long as the ionic liquid media does not inactivate the processing aid. Carboxylate salts such as sodium, potassium, ammonium, and choline acetates can be added to the ionic liquid mixtures to facilitate dissolution. Some other examples of processing aids, include but are not limited to, catalysts, metal salts, polyoxymetalates (POMs) (e.g., $H_5[PV_2Mo_{10}O_{40}]$), anthraquinone, enzymes, and the like. It is also possible to add solvents to the ionic liquid mixtures to aid in dissolution and processing. For example, ethanol, glycol, polyethylene glycol, DMSO, DMF, polyvinylalcohol, polyvinylpyrrolidone, furan, pyridine and other N containing bases, and the like can be added. In some examples the ionic liquid mixtures can be mixed with polyalkylene glycols as disclosed in WO09/105236, which is incorporated by reference herein for its teaching of fractioning polymers and their use in ionic liquids. In further examples, the following ammonium salts can be added to the ionic liquids to improve dissolution $Bu_4NOH$, $Bu_4N(H_2PO_4)$, $Me_4NOH$, $Me_4NCl$, $Et_4NPF_6$, and $Et_4NCl$. Any of these processing aids can be added in amounts of up to about 50 wt. % of the IL or ion-containing solvent, e.g., from about 1 to about 10 wt. %, from about 10 to about 40 wt. %, from about 20 to about 30 wt. %, from about 20 to about 50 wt. %, or from about 40 to about 50 wt. %.

SPECIFIC EXAMPLES

Suitable ILs or ion-containing solvents for the disclosed compositions and methods can comprise any of the cations and anions disclosed herein. For example, the composition can comprise a 1-alkyl-3-methylimidazolium halide or a 1-alkyl-3-methylimidazolium $C_{1-6}$ carboxylate (e.g., a 1-alkyl-3-methylimidazolium $C_{1-6}$ acetate). Some further specific examples include, but are not limited to, 1-ethyl-3-methylimidazoium chloride, 1-butyl-3-methylimidazolium chloride, 1-ethyl-3-methylimidazolium acetate, 1,3-diethylimidazolium acetate, 1,3-dimethylimidazolium acetate, allylmethylimidazolium chloride, allylbutylimidazolium chloride, diallylimidazolium chloride, allyloxymethylimidazolium chloride, allylhydroxyethylimidazolium chloride, allylmethylimidazolium formate, allylmethylimidazolium acetate, benzylmethylimidazolium chloride, bis(methylimidazolium)sulfoxide chloride, ethylmethylimidazolium benzoate, ethylmethylimidazolium triflate, ethylmethylimidazolium chloride, ethylmethylimidazolium acetate, ethylmethylimidazolium xylenesulfonate, ethylmethylimidazolium methylphosphonate, propylmethylimidazolium formate, butylmethylimidazolium chloride, butylmethylimidazolium chloride+$FeCl_3$, butylmethylimidazolium $MeSO_4$, butylmethylimidazolium $(CN_2)N$—, butyl-2,3-dimethylimidazolium chloride, methylhydroxyethylimidazolium chloride, N,N'-dimethylimidazolium chloride, N,N'-dimethylimidazolium mesylate, N,N'-dimethylimidazolium acetate, 1-(2-hydroxylethyl)-3-methylimidazoium chloride, 1-methyl-3-(4-vinylbenzyl)imidazolium chloride, 3,3-ethane-1,2-dylbis(methylimidazolium) dichloride, 3,3-ethane-1,2-dylbis(methylimidazolium) dichloroaluminate, 1-vinyl-3-(4-vinylbenzyl)imidazolium chloride, diethyl N-methyl-N-(2-methoxyethyl)ammonium $Tf_2N$, hydroxybutyl trimethylammonium carbamate, nitronium $Tf_2N$, tetrabutylammonium benzoate, tetrabutylammonium, dodecylbenzenesulfonate, tetrabutylammonium hydroxide, tetrabutylammonium xylenesulfonate, phenyltributylammonium xylenesulfonate, allylmethylpyridinium chloride, benzylpyridinium chloride, butylmethyl pyrrolidinium 4-hydroxybenzenesulfonate, ethylpyridinium bromide, trihexyltetradecylphosphonium xylenesulfonate, choline chloride+urea, choline chloride+$ZnCl_2$, and 1-methyl-3 butyl-imidazolium thioacetate.

Some additional examples of ILs include, but are not limited to, the following quaternary ammonium salts: $Bu_4NOH$, $Bu_4N(H_2PO_4)$, $Me_4NOH$, $Me_4NCl$, $Et_4NPF_6$, and $Et_4NCl$.

Electrospinning Chitin

In various examples disclosed herein, exoskeletons including chitin (i.e., the chitinous biomass) can be partially or completely dissolved with or without derivatization in the disclosed ILs or ion-containing solvents. A contemplated mixture of chitinous biomass in the IL or ion-containing solvent can contain chitin in an amount of from about 0.5 to about 5 wt. %, from about 0.5 to about 4.4 wt. %, from about 0.5 to about 4.0 wt. %, from about 0.5 to about 3.5 wt. %, from about 0.5 to about 3.0 wt. %, from about 0.5 to about 2.5 wt. %, from about 0.5 to about 2.0 wt. %, from about 0.5 to about 1.5 wt. %, from about 0.5 to about 1.0 wt. %, from about 1.0 to about 3.0 wt. %, from about 1.5 to about 3.0 wt. %, or from about 2 to about 3.0 wt. % of the mixture. The preferred range is from about 0.5 to about 3.0 wt. %, or even more preferred, from about 0.5 to about 2.5 wt. % of the mixture. Higher concentrations tend to produce solutions that are viscous and difficult to spin fibers from. By using processing aids as discussed herein, however, higher concentrations of chitin can be obtained, e.g., from greater than about 5, 10, or even 15 wt. %. The disclosed compositions and methods can also comprise one IL or ion-containing solvent or mixtures of two or more ILs or ion-containing solvents in any suitable combination. In certain examples, the IL or ion-containing solvent is selective for chitin.

Various processing methods can be used to dissolve chitinous biomass in an IL or ion-containing solvent and extract chitin therefore. For example, the chitinous biomass, such as an exoskeleton, can be contacted with one or more ILs or ion-containing solvents by submerging the biomass into the liquid. The exoskeleton can be obtained, for example, from the shells of exoskeletal animals, such as shellfish. Examples of suitable shellfish for use in the methods described herein include crab, shrimp, crayfish, and lobster. Optionally, one or more solvents (e.g., ethanol) can be added to the mixture of exoskeleton and one or more ionic liquids. Suitable ILs or ion-containing solvents for dissolving the chitinous biomass and extracting the chitin are discussed herein and include 1-ethyl-3-methylimidazolium acetate ([$C_2$mim]OAc or [$C_2C_1$Im]OAc), 1-ethyl-3-methylimidazoium chloride ([$C_2$mim]Cl), 1-butyl-3-methylimidazolium chloride ([$C_4$mim]Cl, 1,3-diethylimidazolium acetate [$C_2C_2$Im]OAc, 1,3-dimethylimidazolium acetate [$C_1C_1$Im]OAc). The other ionic liquids (cation and anion combinations contemplated herein) can also be used.

Optionally, the dissolution of chitin can be aided by mechanically agitating the mixture. For example, the mixture can be stirred or blended to form a slurry. In some aspects, the mixture is agitated at a low temperature or at room temperature. In other aspects, the mixture is agitated at an elevated temperature. In further aspects, the composition can be cooled or heated at a temperature effective for dissolving the chitin in the ionic liquid(s), for example, from about 0° C. to about 250° C., from about 0° C. to about 120° C., from about 40° C. to about 120° C., from about 80° C. to about 120° C.

In some aspects, the mixture can be irradiated with microwaves, infrared, or ultrasound irradiation, and/or other external sources of energy supply. It is known from the recent literature concerning organic synthesis that the reaction times of organic reactions are remarkable reduced when the energy necessary for the occurrence of the reaction is introduced to the system by using microwave irradiation. There is a wide and continuously increasing literature available in the area of using microwave techniques in organic synthesis. An example of a short summary article of this topic was published by Mingos in 1994 ("Microwaves in chemical synthesis," *Chem Indus* 596-599 (1994)). Loupy et al. have recently published a review concerning heterogenous catalysis under microwave irradiation (Loupy, "New solvent-free organic synthesis using focused microwave," *Synthesis* 1213-1234 (1998)). Another representative article of the area is published by Strauss as an invited review article ("A combinatorial approach to the development of environmentally benign organic chemical preparations," *Aust. J. Chem.* 52:83-96 (1999)).

Because of their ionic nature, ILs and ion-containing solvents are excellent media for utilizing microwave techniques. The commonly used frequency for microwave energy is 2.45 GHz. In the disclosed methods, the frequency for microwave energy can be reduced. In some aspects, the lower frequency results in higher dissolution of the chitinous biomass. For example, the frequency for microwave energy can be less than 2.0 GHz, less than 1.5 GHz, or less than 1.0 GHz. In some aspects, the frequency for microwave energy is 990 MHz or less, 980 MHz or less, 970 MHz or less, 960 MHz or less, 950 MHz or less, 940 MHz or less, 930 MHz or less, 920 MHz or less, 915 MHz or less, 910 MHz or less, or 900 MHz or less. In some aspects, the frequency for microwave energy is 915 MHz.

The microwave irradiation can be continuous, as used in a continuous flow induscital microwave reactor. The microwave irradiation can also be conducted in multiple pulses for a given total duration of irradiation time with optional stirring between the pulses. Pulsed irradiations combined with stirring between the pulses prevent overheating of the samples. For example, the microwave irradiation can be conducted in 1-30 second pulses for a total of irradiation time of 1-30 minutes, in 2-20 second pulses for a total of irradiation time of 2-20 minutes, in 3-15 second pulses for a total of irradiation time of 3-15 minutes, in 5-10 second pulses for a total of irradiation time of 5-10 minutes. In some aspects, the microwave irradiation is conducted in 2-3 second pulses for a total of irradiation time of 2 minutes.

Any processing time can be used to get the chitin to at least partially dissolve in the mixture, for example from seconds to hours, such as from 1 to 16 hours, 1 to 12 hours, or from 1 to 5 hours. At lower temperatures, the processing time is longer. At higher temperatures or under microwave irradiation, the processing time is shorter.

The chitin from the chitinous biomass can be completely or partially dissolved or suspended in the IL or ion-containing solvent at up to about 5 wt % without processing aids or up to about 15 wt % with processing aids. A processing aid can already be present in the IL or ion-containing solvent or can be added after the chitin is dissolved. Catalysts and any optional additives can be used to increase dissolution, facilitate disintegration, cleave bonds, separate chitin from the chitinous biomass, and for derivatization and other treatments of chitin.

The chitin can then be drawn into fibers by electrospinning the chitin solution into a non-solvent (also called a coagulant). The non-solvent can be water, a $C_1$-$C_{12}$ linear or branched alcohol, ketone (e.g., acetone or methylethylketone), or other organic solvent not suitable for dissolving chitin. In one example, the non-solvent is water. In another example, the non-solvent is a $C_1$-$C_4$ linear or branched alcohol, for example, methanol, ethanol, propanol, isopropanol, butanol, sec-butanol, iso-butanol, or tert-butanol. In one example, ethanol is used as the non-solvent. In a further example, a mixture of water and a $C_1$-$C_4$ linear or branched alcohol can be used as a non-solvent, for example, water/methanol, water/ethanol, and the like. For this example, any ratio of water to solvent can be used, for example, from about 5:95 water/solvent to 95:5 water/solvent.

Electrospinning is then performed to create a fiber directly from the chitin/ionic liquid or ion-containing solvent mixture. A schematic representation of an electrospinning set up 100 is shown in FIG. 1. In the electrospinning process, a high voltage is used to create an electrically charged jet of the chitin/ionic liquid or ion-containing solvent mixture 110, which then passes through a non-solvent that removes the ionic liquid or ion-containing solvent, leaving a chitin fiber. One electrode 102 is placed into the spinning mixture, i.e., the chitin/ionic liquid or ion-containing solvent mixture, e.g. by connecting to a needle electrode 104, and the other electrode 106 attached to a collector 108 under a non-solvent bath. Electric field is subjected to the end of a syringe needle that contains the chitin/ionic liquid or ion-containing solvent mixture held by its surface tension. This induces a charge on the surface of the liquid. Mutual charge repulsion causes a force directly opposite to the surface tension. As the intensity of the electric field is increased, the hemispherical surface of the fluid at the tip of the tube elongates to form a conical shape known as the Taylor cone. With increasing field, a critical value is attained when the repulsive electrostatic force overcomes the surface tension and a charged jet of fluid is ejected from the tip of the Taylor cone. The discharged chitin mixture jet undergoes a whipping process. In electrospinning with traditional solvents, the solvent is usually evaporated by the whipping motion, leaving behind a charged polymer fiber, which lays itself randomly on a grounded collecting metal screen. In contrast, the solvents here are ionic liquids or ion-containing solvents that do not evaporate. They are removed, however, by placing a non-solvent bath between the jet and the collector plate. As the jet passes through the non-solvent bath, the ionic liquid or ion-containing solvent mixture is removed leaving behind the chitin fiber.

A characteristic of electrospinning is the ability to make fibers with diameters in the range of nanometers to a few micrometers. Consequently these fibers have a large surface area per unit mass so that non-woven fabrics of these fibers can be used for example, for filtration of submicron particles in separation industries and biomedical applications, such as wound dressing in medical industry, tissue engineering scaffolds and artificial blood vessels.

By using electrospinning, the morphology of the fibers can be adjusted by varying the viscosity of the chitin/ionic liquid or ion-containing solvent mixtures, the electric potential, the temperature of the solution, flow rate, or a combination of these factors. More viscous mixtures (e.g., higher concentrations of chitin) can resist deformation during the whipping process and break instead of drawing. Higher electric potentials and faster flow rates result in thinner fibers. At higher temperature, the viscosity of the mixture decreases. By varying the temperature, the viscosity of the mixture can be controlled. For example, the mixture can be maintained at above ambient temperature to decrease the viscosity of the mixture to be electrospun. By decreasing the viscosity of the mixture, mixtures with higher chitin concentration can be electrospun. The mixture can be maintain at about 100° C. (e.g. about 90° C., 80° C., 70° C., 60° C., 50° C., 40° C., 35° C., and 30° C.).

With increasing electric potential, the chitin jet is discharged with a greater electrostatic repulsion that causes it to undergo higher levels of drawing stress. This results in the decrease of the fiber diameter. However, at higher electric potential the fiber diameter distribution becomes increasingly broader. Hence the control of the process at high electric potential, flow rate, and concentration becomes increasingly difficult. In the disclosed methods, the concentration of the chitin should be, as noted above, from about 0.5 to about 15 wt. % of the mixture. The electric potential should be from about 5 kV to about 45 kV (e.g., from about 5 to about 40 kV, from about 5 to about 35 kV, from about 5 to about 30 kV, from about 5 to about 25 kV, from about 5 to about 20 kV, or from about 5 to about 15 kV), the flow rates should be from about 3 mL/h to about 20 mL/h (e.g., from about 3 mL to about 10 mL/h or from about 10 mL/h to about 20 mL/h), though higher concentrations, potentials, and flow rates can be used if desired.

Further, the distance between the jet and the non-solvent bath or collector can be varied. Further distances generally allow more whipping and thus more random or coiled fibers. Also, the collector shape can be varied or rotated to produce mats of different shapes or thicknesses. Typically, the distance between the jet and the collector is from about 1 cm to about 20 cm, from about 5 cm to about 15 cm, or from about 10 cm to about 20 cm.

Electrospinning the chitin mixture can provide a high-throughput and continuous method for producing chitin fibers with a high surface area (e.g., from about 10 $m^2$ $g^{-1}$ to as high as about 1000 $m^2$ $g^{-1}$) in high yields. In certain examples, the chitin fibers with a surface area of from about 10 to about 500, from about 500 to about 1000, from about 250 to about 750, from about 100 to about 500, from about 300 to about 600, or from about 400 to about 800 $m^2 g^{-1}$ can be produced.

Further, nearly all of the ionic liquids used in the method can be recovered using the disclosed electrospinning techniques. In some examples, at least 80%, at least 85%, at least 90%, or at least 95% of the used ionic liquids can be recovered. For example, at least 90%, at least 91%, at least 92%, at least 93%, at least 94%, at least 95%, at least 96%, at least 97%, at least 98%, or at least 99% of the used ionic liquids can be recovered. The recovered ionic liquids can be re-used, for example, to process another batch of chitinous biomass.

Using the methods described herein, a significant amount of chitin present and available in chitinous biomass can be extracted and recovered. In some aspects, greater than 80% of chitin available in chitinous biomass can be recovered. In other aspects, greater than 81%, greater than 82%, greater than 83%, greater than 84%, greater than 85%, greater than 86%, greater than 87%, greater than 88%, greater than 89%, greater than 90%, greater than 91%, greater than 92%, greater than 93%, greater than 94%, greater than 95%, greater than 96%, greater than 97%, greater than 98%, or greater than 99% of the available chitin can be recovered.

The chitin extracted according to the methods described herein can be of a higher molecular weight and purity than chitin produced according to other methods. The purity of the chitin can be determined, for example, using elemental analysis or energy-dispersive X-ray spectroscopy techniques. In certain examples the chitin prepared by the methods disclosed herein can have a relative viscosity of from about 1 to about 1.5, as measured in a solution of (0.0252 g) chitin in 12 g [$C_2$mim]OAc at 35° C. In other examples the relative viscosity of the chitin can be from about 1 to about 1.4, from about 1 to about 1.3, from about 1 to about 1.2, or from about 1 to about 1.1, as measured in a solution of (0.0252 g) chitin in 12 g [$C_2$mim]OAc at 35° C.

The components of the mixture, such as the chitinous biomass for example, can be dissolved simultaneously (or selectively) and optionally regenerated separately later using appropriate non-solvents.

Optionally, the chitin, once dissolved, can be separated from waste materials, such as proteins, oils, and salts. The chitin can be processed to prepare other articles or compositions comprising other components. In some aspects, nanofiber containing sheets or mats can be prepared using the disclosed ionic liquid mixtures. In these methods, chitin fibers can be spun from IL solutions of dissolved shrimp shells. In some aspects, the chitin is first reconstituted and re-dissolved prior to spinning. These steps can result in fibers that are stronger than fibers produced without reconstituting and redissolving the chitin. For example, fibers produced from the first dissolution of the waste shrimp shells can result in fibers with an ultimate stress measurement of 133.8 MPa. However, the ultimate stress of the fibers increased to 237.2 MPa when the chitin was reconstituted and redissolved. In some aspects, reconstituting and redissolving the chitin results in fibers with an increase of the ultimate stress of 20 MPa or more, 30 MPa or more, 40 MPa or more, 50 MPa or more, 60 MPa or more, 70 MPa or more, 80 MPa or more, 90 MPa or more, 100 MPa or more, 150 MPa or more, or 200 MPa or more. The stress measurements disclosed herein were taken on a length of 10 cm using a MTSQ-Test 25 machine attached with a specially designed pneumatic grip suitable for thin and flexible fiber testing. A load cell of 22.4 newton capacity was used for load measurement. The cross head speed was maintained at 1.27 mm $min^{-1}$ and the test data in terms of stress and strain were obtained using a data acquisition system.

Further, the fibers produced according to the methods described herein are stronger (i.e., have a higher ultimate stress) than the fibers produced from pure grade or practical grade chitin produced by acid demineralization of the chitinous biomass. In some aspects, the chitin fibers spun directly from the solution obtained by dissolution of the chitinous biomass as described herein can be as strong as those prepared with cellulose pulp.

In addition to electrospinning, the chitin/ionic liquid solutions disclosed herein can be electrosprayed. Electrospraying the solutions can provide a high-throughput and continuous method for producing chitin with a high surface area (i.e., from about 10 $m^2$ $g^{-1}$ to as high as about 1000 $m^2$ $g^{-1}$) in high yields (Kalra, et al., Small 5:2323-2332, 2009, which is incorporated by reference herein for its teaching of electrospraying methods). In certain examples, the chitin with a surface area of from about 10 to about 500, from about 500 to about 1000, from about 250 to about 750, from about 100 to about 500, from about 300 to about 600, or from about 400 to about 800 $m^2 g^{-1}$ can be produced.

Electrostatic spraying can be done by using air-atomizing induction charge nozzle, which allows air and liquid to enter the nozzle separately. The air moves at a high speed through the nozzle and intersects the liquid at the nozzle tip, causing the formation of spray droplets. Because electrostatic sprayers are designed for volatile liquids, and not nonvolatile ionic liquids, modifications to the electrostatic spraying apparatus may be required. For example, the disclosed electrostatic spraying methods can involve allowing the air and ionic liquid to enter the nozzle together or allowing the ionic liquid to enter through the nozzle and intersect the air at the nozzle tip.

The droplets are generally 30-40 μm in diameter. The air pressure is usually about 30-40 PSI, while the liquid pressure is below 15 PSI. As the spray is atomized, the droplets pass a unique embedded induction electrode that induces a charge on each droplet. A battery or direct power supply provides the electrical charge. The negatively charged droplets are propelled into the non-solvent by the force of the turbulent air stream. The electrostatic charge on the spray droplets is negative. Once the liquid is shut-off, the air pressure siphons out any remaining spray. Air keeps the nozzle passages clear, reducing maintenance.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures, and other reaction ranges and conditions that can be used to optimize the product purity and yield obtained from the described process. Only reasonable and routine experimentation will be required to optimize such process conditions.

Example 1

Characterization of Chitin and Crustacean Shells

Pure chitin (from crab shells, C9752) and practical grade chitin (PG-chitin; from crab shells, C7170) were purchased from Sigma (St. Louis, Mo.) and used directly without further purification. Shrimp and crab were thawed and carefully peeled to make sure no obvious meat was left. The shells were washed three times with tap water and then dried in an oven (Precision Econotherm Laboratory, Winchester, Va.) at 80° C. for 2 days. The dried shells were ground for 1 min using a Janke & Kunkel mill (Ika Labortechnik, Wilmington, N.C.) and separated using brass sieves (Ika Labortechnik, Wilmington, N.C.) with pore sizes ranging from 0.125 mm to 1 mm, into particle sizes of 0.125-0.5 mm.

The moisture content of the samples was determined gravimetrically by mass loss after drying in an oven at 105° C. for 24 h (Rodde et al., *Carbohydr. Polym.*, 71:388-393 (2008)). Ash content was determined as the final mass obtained after heating the dry sample in a dish in a muffle furnace at ca. 525° C. until constant weight was obtained (AOAC. In *Official Methods of Analysis of the Association of Official Analytical Chemists*, 13$^{th}$ ed.; W. Horwitz, Ed.; AOAC International: Washington D.C., 1981, pp 289, 508). Chitin content was determined according to the Black and Schwartz methodology (Black, M. and Schwartz, H., *Analyst*, 75:185-189 (1950)). The results are shown in Table 1.

TABLE 1

|  | Pure chitin | PG-chitin | Shrimp shells | Crab shells |
|---|---|---|---|---|
| Moisture | 5.5 | 5.3 | 8.7 | N/A |
| Ash | 0.3 | 2.2 | 34.5 | 30-50 |
| Chitin | 81.8 | 78.9 | 27.2 | 13-41 |
| Recon. Chitin$^a$ | 87.1 | 84.7 | 81.1 | N/A |

$^a$Chitin content of the reconstituted chitin from dissolution of each chitin source using the reconstitution method described in Example 5 below.

The analyses of the commercial samples indicated chitin contents of 81.8% chitin in pure grade and 78.9% in PG-chitin (compared to 27.2% chitin in shrimp shells). In addition, the mineral (ash) content in PG-chitin is higher than in pure chitin.

Example 2

Comparison of Pure Chitin, PG-Chitin, and Crustacean Shell Dissolution Using Oil Bath Heating Method Ionic liquids [C$_2$mim]Cl, [C$_4$mim]Cl, and [C$_2$mim]OAc (purity ≥90%) were obtained from BASF (Ludwigshafen, Germany) and dried in a vacuum oven at about 70° C. for 20 h before use. Deionized (DI) water was obtained from a commercial deionizer Culligan, Northbrook, Ill.) with specific resistivity of 17.25 MΩ cm at 25° C. Dimethyl sulfoxide (DMSO) (≥99.6%) was purchased from Aldrich (St. Louis, Mo.) and used as received.

The abilities of [C$_2$mim]OAc, [C$_4$mim]Cl, and [C$_2$mim]Cl to dissolve a given mass of pure chitin vs. PG-chitin were determined. Approximately 1 g of PG-chitin, or dried, ground shrimp shells was mixed with 10 g of IL in a 50 mL Pyrex glass beaker with a magnetic stir bar. For dissolution of pure chitin, 0.5 g of pure chitin was mixed with 2 g of dried IL in a 20 mL glass vial with a magnetic stir bar. The mixture was vigorously stirred (about 700 rpm) and heated in an oil bath at 100° C. in air using a digital stirring hotplate (ISOTEMP, Fisher Scientific, Dubuque, Iowa). After heating for 19 h, the mixture was transferred to a 20 mL glass vial, and ca. 2-10 mL of DMSO were added to the mixture to reduce the viscosity and remove any dissolved substances adsorbed or trapped within the solid texture. The mixture was vortexed by a Thermolyne type 37600 mixer (Dubuque, Iowa) for 30 s and centrifuged (CLAY ADAMS Brand DYNAC centrifuge, Sparks, Md.) at 100×g for 10 min. (Dilution of the dissolution mixture by DMSO was carried out at room temperature and finished within 30 min. It was tested and found that chitin is not soluble in DMSO under these conditions.) The undissolved residue was then separated, washed with DI water (3×20 mL) and dried in oven at 80° C. for 20 h. The dried residue was weighed and the dry mass (mR) was used to calculate the percent dissolved using the following equation 1: Percent Dissolved=$(m_I-m_R)/m_I \times 100$, where $m_I$ is the initial mass of dried chitinous sample. The results are shown in Table 2.

TABLE 2

| | Percent Load Mass Dissolved (%) | | |
|---|---|---|---|
| | [C$_2$mim]Cl | [C$_4$mim]Cl | [C$_2$mim]OAc |
| Pure chitin | 13.9 | 24.4 | 80.0 |
| PG-chitin | 4.2 | 6.8 | 15.2 |
| Shrimp shells | 9.7 | 10.0 | 46.0 |

The results indicated that much more of the pure chitin sample (80.0%) could be dissolved in [C$_2$mim]OAc than either [C$_4$mim]Cl (24.4%) or [C$_2$mim]Cl (13.9%). Even with the lower loading (1 part to 10) chosen for PG-chitin, much less (15.2%) can be dissolved than pure chitin in [C$_2$mim]OAc, presumably because of the higher mineral content of the former. Nonetheless, [C$_2$mim]OAc could dissolve much more of the PG-chitin samples than either [C$_2$mim]Cl (4.2%) or [C$_4$mim]Cl (6.8%).

For cellulose and other carbohydrates, research has shown that the primary mechanism of solvation by an IL is the anion's ability to break the extensive hydrogen-bonding networks by specific interactions with hydroxyl groups, and it has been shown that improved dissolution of biopolymers is possible by increasing the hydrogen bond basicity of the anion (Remsing et al., *Chem. Commun.* 1271-1273 (2006); Fukaya et al., *Biomacromolecules*, 7:3295-3297 (2006)). The much higher solubilities of chitin of any grade in [C$_2$mim]OAc vs. [C$_n$mim]Cl shown in Table 2 support this concept.

Table 2 also shows that [C$_4$mim]Cl gives better dissolution for all the chitinous samples than [C$_2$mim]Cl. This is consistent with a recently published result, where [C$_4$mim]Cl is reported to exhibit better cellulose dissolution than [C$_2$mim]Cl and other ILs bearing longer alkyl chains, although the reason is still uncertain (Erdmenger et al., *Macromol. Biosci.*, 7:440-445 (2007)).

Example 3

Study of Shrimp Shell Dissolution at Room Temperature

Approximately 1 g of dried, ground shrimp shells (as above) was mixed with 10 g of dried [C$_2$mim]OAc in a 20 mL glass vial. The mixture was left at room temperature with occasional stirring for 4 months in air. After that, the viscous mixture was diluted by DMSO (10 mL) and the undissolved residue was separated, washed, and dried by the same method as above. [C$_2$mim]OAc dissolved 10.2% of the shrimp shells.

Example 4

Study of Oil Bath Heating vs. Microwave Irradiation on Chitin Dissolution

Microwave heating (3 s pulses at full power for 2 min in a domestic microwave oven with vigorous stirring between pulses) is more efficient than oil-bath heating in dissolving chitinous biomass. For the microwave heating method, approximately 0.2-0.4 g of chitinous sample was mixed with 10 g of dried IL in a 20 mL glass vial. The mixture was heated in a domestic 2.45 GHz microwave oven (SHARP Carousel R-209KK, Mahwah, N.J.) using 3 s pulses at full power for 2 minutes. Care was taken to avoid overheating the IL. Between each pulse, the vial was removed, the mixture was manually stirred by a glass rod, and then replaced in the microwave. Complete dissolution was monitored by removing a drop of the mixture and placing it in between two pieces of closely contacted glass slides for observation of any undissolved residue using an optical microscope (Reichert Stereo Star Zoom 580, Depew, N.Y.). Pure and PG-chitin (ca. 0.4 g) were found to be completely dissolved in 10 g of [C$_2$mim]OAc with total irradiation time under 2 min.

Frozen shrimp were thawed, carefully peeled to make sure no obvious meat was left, and the backs and tails retained. These were washed three times with tap water, dried in an oven (80° C.) for 2 days, and then ground (1 min) using a mill and sieved into particle sizes of 0.125-0.5 mm. The ground shells were added to the ILs (1 g to 10 g) and heated in an oil bath as described in Example 2. [C$_2$mim]OAc dissolved much more of the shrimp shell samples (46.0%) than [C$_2$mim]Cl (9.7%) or [C$_4$mim]Cl (10.0%). Using the microwave method at a loading of 0.4 g per 10 g IL, 73.5% shrimp shell sample (at least 94% of the available chitin, see below) can be dissolved in [C$_2$mim]OAc with total irradiation time of 2 min.

Example 5

Reconstitution of Chitin from IL Solution

The dissolved chitins were reconstituted using water, which solubilizes the IL. Each clear IL solution was poured slowly into a beaker containing 200 mL of coagulating solvent (DI water) and white flocs formed immediately. Each mixture was then stirred at room temperature for 3 h and poured into four 50 mL glass vials for centrifugation. After centrifugation at 100×g for 10 min, the settled flocs were triply washed with DI water (3×100 mL), and dried at 80° C. for 20 h in the oven. The yield of reconstituted chitin was calculated using this equation: Chitin Reconstitution Yield (wt %)=($m_{RC}$×$C_{RC}$)/($m_D$×$C_{DC}$)×100, where $m_{RC}$ is the mass of dried reconstituted chitin and $m_D$ is the mass of dissolved chitinous material. In partial dissolution, $m_D$=$m_I$−$m_R$; and in complete dissolution, $m_D$ is the total amount of chitinous sample dissolved in IL. $C_{RC}$ is the chitin content (wt %) of the reconstituted chitin, $C_{DC}$ is the chitin content (wt %) of the dissolved chitinous sample. Both $C_{RC}$ and $C_{DC}$ were determined according to the Black and Schwartz methodology (Black and Schwartz, *Analyst*, 75:185-189 (1950). The percentage of available chitin recovered for the pure chitin was 40.2%, the percentage recovered for PG-chitin was 87.4%, and the percentage recovered for shrimp shells was 94.0%. For shrimp shell, the chitin reconstitution yield calculation was based on an assumption that the dissolution of the components is not selective. It is interesting to compare the amount of chitin available in the three dissolved chitinous materials to the chitin recovered after dissolution (microwave heating), where one finds a high recovered chitin yield from shrimp shells (94%), but lower yields from PG-chitin (87.4%) and pure chitin (40.2%). It is possible that the lower MW chitin polymers, as might be expected from commercial processing of chitin, may be more water-soluble, and were washed out during the IL processing. The general properties of the reconstituted chitins were characterized and disclosed in Table 1 above.

The purity of the reconstituted chitin was determined using elemental analysis (see Table 3) and energy-dispersive X-ray spectroscopy (see Table 4). Elemental analyses (CHNO) for chitin or reconstituted chitin samples were obtained from Galbraith Laboratories, Inc. (Knoxville, Tenn.). EDS spectra were recorded on a Philips XL30 SEM-EDS (Eindhoven, The Netherlands).

TABLE 3

| Entry | C, % | H, % | N, % | O, % |
|---|---|---|---|---|
| Theoretical value for chitin ($C_8H_{13}NO_5$)$_n$ | 47.29 | 6.40 | 6.90 | 39.41 |

TABLE 3-continued

| Entry | | | C, % | H, % | N, % | O, % |
|---|---|---|---|---|---|---|
| 1 | Pure chitin | Result | 42.27 | 6.89 | 6.16 | 42.81 |
| | | % Deviation from theory | 10.19 | 7.66 | 10.72 | 8.63 |
| 2 | Reconstituted pure chitin | Result | 46.52 | 6.64 | 6.54 | 38.82 |
| | | % Deviation from theory | 1.63 | 3.75 | 5.22 | 1.50 |
| 3 | PG-chitin | Result | 44.25 | 6.89 | 5.89 | 39.28 |
| | | % Deviation from theory | 6.43 | 7.66 | 14.64 | 0.33 |
| 4 | Reconstituted PG-chitin | Result | 45.51 | 6.50 | 6.17 | 39.47 |
| | | % Deviation from theory | 3.76 | 1.56 | 10.58 | 0.15 |
| 5 | Reconstituted shrimp shell chitin | Result | 44.18 | 6.72 | 6.64 | 41.61 |
| | | % Deviation from theory | 6.58 | 5.00 | 3.77 | 5.58 |

TABLE 4

| Pure chitin | | | Reconstituted pure chitin | | |
|---|---|---|---|---|---|
| Element | Weight % | Atomic % | Element | Weight % | Atomic % |
| C K | 30.06 ± 1.06 | 35.18 ± 1.12 | C K | 29.72 ± 0.47 | 34.78 ± 0.51 |
| N K | 27.09 ± 0.08 | 27.18 ± 0.01 | N K | 27.80 ± 0.42 | 27.90 ± 0.45 |
| O K | 42.86 ± 1.12 | 37.65 ± 1.12 | O K | 42.49 ± 0.04 | 37.33 ± 0.06 |
| Total | 100.00 | 100.00 | Total | 100.00 | 100.00 |

| Practical grade chitin | | | Reconstituted practical grade chitin | | |
|---|---|---|---|---|---|
| Element | Weight % | Atomic % | Element | Weight % | Atomic % |
| C K | 31.01 ± 1.06 | 36.56 ± 1.17 | C K | 31.08 ± 0.59 | 36.36 ± 0.65 |
| N K | 26.63 ± 0.79 | 26.93 ± 0.87 | N K | 26.13 ± 0.76 | 26.21 ± 0.78 |
| O K | 40.34 ± 0.23 | 35.71 ± 0.29 | O K | 42.36 ± 0.30 | 37.21 ± 0.21 |
| Si K | 0.43 ± 0.01 | 0.22 ± 0.01 | Si K | 0.44 ± 0.20 | 0.22 ± 0.10 |
| Cl K | 0.75 ± 0.04 | 0.30 ± 0.01 | Total | 100.00 | 100.00 |
| Ca K | 0.85 ± 0.06 | 0.30 ± 0.02 | | | |
| Total | 100.01 | 100.00 | | | |

| Shrimp shells | | | Reconstituted shrimp shell chitin | | |
|---|---|---|---|---|---|
| Element | Weight % | Atomic % | Element | Weight % | Atomic % |
| C K | 22.55 ± 0.79 | 28.95 ± 0.74 | C K | 30.22 ± 0.15 | 35.54 ± 0.13 |
| N K | 27.31 ± 0.54 | 30.06 ± 0.31 | N K | 25.14 ± 0.50 | 25.35 ± 0.47 |
| O K | 37.20 ± 0.25 | 35.85 ± 0.57 | O K | 43.82 ± 0.57 | 38.20 ± 0.15 |
| Si K | 0.23 ± 0.04 | 0.13 ± 0.02 | Si K | 0.83 ± 0.07 | 0.42 ± 0.04 |
| Ca K | 12.19 ± 0.98 | 4.69 ± 0.42 | Total | 100.00 | 99.50 |
| Mg K | 0.53 ± 0.06 | 0.33 ± 0.04 | | | |
| Total | 99.99 | 100.00 | | | |

Elemental analyses (Table 3) indicated that the reconstituted chitins were of higher purity than the chitins without reconstitution, while energy-dispersive X-ray spectroscopy (Table 4) confirmed the presence of trace and relatively large amounts of minerals in PG-chitin and shrimp shells, respectively, but not in the reconstituted samples. Importantly, the reconstituted chitin from direct extraction of shrimp shells is of higher purity than the commercially available pure chitin used in this study.

Example 6

Viscosity Study on Chitin-IL Solutions

To test whether lower MW chitin polymers are present in commercial processed chitin, the relative viscosities of identical concentrations of each chitin source in an ionic liquid were measured. A chitinous sample (0.0252 g) was mixed with 12 g [$C_2$mim]OAc in a 20 mL vial. The mixture was heated in a domestic microwave oven using 3 s pulses at full power for up to 2 min till complete dissolution was reached. Between each pulse, the vial was removed; the mixture was manually stirred by a glass rod and then replaced in the microwave. The chitin-IL solution was then transferred to an Ubelohde viscometer and the flow time was measured at 35° C. by keeping the viscometer in a water bath. The flow time was measured at least 3 times and the differences were less than 0.2 sec. The reported results are the average of the three readings. The relative viscosities were calculated using the following equation: $\eta_{rel}=(\eta_s/\eta_0)=(t_s/t_0)$, where $\eta_{rel}$ is the relative viscosity, $\eta_s$ or $t_s$ is the viscosity or flow time of the solution, and $\eta_0$ or $t_0$ is the viscosity or flow time of the solvent. The results are shown in Table 5.

TABLE 5

| Samples | Chitin Conc.[a] | Heating Time (s) | Relative Viscosity[b] |
|---|---|---|---|
| [$C_2$mim]OAc | 0 | N/A | 1 |
| Pure chitin | 0.21 | 120 | 1.13 |
| PG-chitin | 0.21 | 120 | 2.02 |
| Shrimp shells | 0.21 | 120 | 1.55 |
| Rec. pure chitin | 0.21 | 60 | 1.10 |
| Rec. PG-chitin | 0.21 | 60 | 1.28 |
| Rec. shrimp shell chitin | 0.21 | 60 | 1.43 |

[a]Concentration of chitin in [$C_2$mim]OAc (%)
[b]Relative viscosity ($\eta_{rel}$) measured as flow time of the solution/flow time of the solvent ([$C_2$mim]OAc).

A decrease in viscosity was observed from the original chitin solutions to the reconstituted chitin solutions; a small decrease for pure chitin $\eta_{rel}$=1.13 vs. 1.10) and shrimp shells (1.55 vs. 1.43), but a dramatic decrease for PGchitin (2.02 vs. 1.28). More interesting were the results for shrimp shell extracts, where the relative viscosity for redissolved reconstituted shrimp shell chitin (1.43) is higher than either reconstituted PG-chitin or pure chitin. This suggests that the chitin extracted directly from shrimp shells is of higher MW, and would be in keeping with the reduced processing and less harsh conditions in the IL extraction than in the industrial processes described earlier.

Example 7

Chitin Fiber Preparation

If indeed the IL dissolution process provides purified chitin of higher average MW as described in Example 6, the hypothesis that chitin fibers could be prepared directly from the IL solution was tested. Between 0.2-0.4 g chitin (PG-chitin, shrimp shells or chitin regenerated from them) was mixed with 10 g IL in a 20 mL vial. The mixture was heated in a domestic microwave oven using 3 s pulses at full power for 2 min till complete dissolution was reached. Between each pulse, the vial was removed; the mixture was manually stirred by a glass rod and then replaced in the microwave. The chitin-IL solutions were used to produce chitin fibers using a dry jet wet spinning method as described for producing cellulose fibers from IL solution (Sun et al., *J. Mater. Chem.* 18:283-290, 2008, which is incorporated herein for its teachings of fiber spinning techniques). DI water was used as the coagulant. After centrifugation, where gas bubbles were completely removed, each chitin-IL sample was carefully loaded into a 10-mL syringe which was then attached to a syringe pump (Model No. NE-1010, New Era Pump Systems, Inc, Farmingdale, N.Y.) with a temperature controller set at 60° C. Each solution was extruded into a 0.6 m long water bath after a 5 cm air gap. Each regenerated chitin filament was led through the first two steps of the godets, and then wound onto the take-up spool. An extrusion rate of 0.7 mL/min was used. The voltage settings for godets and take-up spool were 4.2 V and 2.9 V, respectively. The produced fibers were soaked in warm DI water for 1-2 days to remove the residual IL and then air dried.

It was not possible to spin fibers from either a solution of pure chitin or reconstituted pure chitin, suggesting the MW of the chitin polymers in these samples was low. Chitin fibers could be spun from solutions of as-received or reconstituted PG-chitin and shrimp shells, in agreement with the relative viscosity results indicating these chitins are of higher MW. Interestingly, chitin fibers could be spun from a solution resulting from the direct dissolution of shrimp shells in a one-pot process.

Example 8

Characterization

Further evidence for the relative MWs of the chitin samples was obtained by testing the tensile strengths of each fiber using an MTS Q-Test 25 machine with a specially designed pneumatic grip suitable for thin and flexible fiber testing. Three fibers of uniform cross-section from each type were tested using a load cell of 22.4 Newton capacity and a cross-head speed maintained at 1.27 mm min$^{-1}$. The results are shown in Table 6.

TABLE 6

| Samples | Conc. to spin fiber (wt %) | Fiber thickness (mm) | Ultimate Stress (MPa) | Failure Strain (%) | Young's Modulus (GPa) |
|---|---|---|---|---|---|
| Pure chitin | — | — | — | — | — |
| PG-chitin | 3.4 | 0.13 (3) | 80 (9) | 5.0 (9) | 4.7 (8) |
| Shrimp shells | 3.8 | 0.06 (1) | 133 (13) | 3.3 (3) | 8.6 (2) |
| Rec. pure chitin | — | — | — | — | — |
| Rec. PG-chitin | 4.0 | 0.09 (1) | 132 (10) | 6.9 (4) | 5.3 (5) |
| Rec. shrimp shells | 2.1 | 0.07 (1) | 237 (26) | 13 (4) | 10 (1) |
| Cellulose MCC | 11.5 | 0.15 (3) | 129 (17) | 24 (3) | — |
| Cellulose pulp | 4.3 | 0.07 (1) | 217 (17) | 13 (0) | — |

The results indicate that chitin fibers made from the second dissolution of PG-chitin or reconstituted shrimp shells are stronger than those made from the first dissolution of either chitin source (132.2 vs. 80.1 MPa and 237.2 vs. 133.8 MPa, respectively). These results, along with the values for relative viscosities of the IL solutions, strongly suggest that the reconstituted chitins have higher average MW than the original chitin samples. In addition, the fiber produced from reconstituted shrimp shell chitin is much stronger than the fiber produced from reconstituted PG-chitin (237.2 vs. 132.2 MPa), again supporting the viscosity data and suggesting the MW of the chitin recovered from the direct IL extraction from shrimp shells is much higher than that of PG-chitin. Interestingly, the chitin fibers are as strong as cellulose fibers (DP=1056) prepared from ILs in a similar process (Sun et al., *J. Mater. Chem.* 18:283-290, 2008).

The morphologies of the chitin fibers were analyzed by scanning electron microscopy (SEM). SEM images were recorded on a Philips XL30 SEM-EDS (Eindhoven, The Netherlands) where the SEM was equipped with elemental analysis capabilities. The SEM images were taken by first sputtercoating the samples with gold to improve the conductivity. Different chitin materials give different fiber morphologies. Chitin fiber made from shrimp shells had a belt shape indicating chitin solidified at a relatively slow rate, thus the chitin fiber was fully stretched on the godets and resulted in a belt-shaped fiber. A fiber made from PG-chitin had a cubic cross-section composed of multilayers, which might come from a differential coagulation rate from surface to the interior.

Example 9

Electrospinning of Chitin from Chitinous Biomass

In a manner similar to Example 4, small scale dissolution of shrimp shell was performed using a domestic microwave oven (SHARP Carousel R-209KK, Mahwah, N.J.) at full power. 200 mg ground shrimp shell was dissolved in 9.80 g [$C_2$mim][OAc] or [$C_2C_1$Im][OAc] in a beaker and mechanically stirred between pulses with a glass stirring rod. The mixture was heated for a total of 2 minutes using 2-3 sec pulses.

The chitin solution was subjected to electrospinning, the process of which is schematically illustrated in FIG. 1. All electrospinning experiments described herein were conducted in a similar fashion. Specifically, a 3 mL sample of the chitin solution was transferred to a syringe for subsequent extrusion. The syringe was equipped with a needle 110 as a needle electrode, with a voltage applied to the needle electrode 104 with a grounded charge in the form of a stainless steel plate 108 beneath the glass collection bath 108. The nozzle-to-ground target distance was fixed at certain distance. The chitin solution was delivered to the spinner head 112 using air pressure from a syringe pump 114 (New Era Pump Systems Inc., Farmingdale, N.Y.) with a set flow rate. The coagulation solvent was water. A detailed example follows: 3 mL of 2 wt % shrimp shell loading in [$C_2C_1$Im][OAc] was transferred to a syringe with a 18.5 G needle. A voltage of 20 kV was applied to the needle electrode with the needle-to-ground target distance fixed at 10 cm. The syringe pump was set to a flow rate of 0.5 mL/min. The coagulation bath was filled with water. The solution was then subjected to electrospinning Upon complete electrospinning of the 3 mL of solution, the resulting fibers were kept in the water bath overnight to ensure the complete removal of the ionic liquid. The fibers were then removed, washed with water, and dried upon the electron microscopy stubs for analysis.

Important parameters and conditions for electrospinning and electrospraying include choice of IL, concentration, chitinous sample, voltage, needle size, flow rate were studied and the materials formed with corresponding observations are summarized in Table 7 below.

TABLE 7

| Trial | Ionic Liquid | *wt. % | Chitin Type | Voltage (kV) | Needle (G) | Air flow (mL/min) | Materials formed and observations |
|---|---|---|---|---|---|---|---|
| 1 | [C₂C₂Im][OAc] | 1.5 | PG-Chitin | 28 | 18.5 | 0.05 | Electrospraying/electrospinning Non-consistent fiber formation of beaded fibers. Size mostly micron, but some nanofibers. |
| 2 | [C₂C₂Im][OAc] | 1.5 | PG-Chitin | 28 | 16.5 | Gravity | Electrospinning, more consistent fiber formation with significant deformations on surface of fibers. Sizes from smaller micron to nanofibers. |
| 3 | [C₂C₂Im][OAc] | 3 (loading) | Shrimp shell extract | 28 | 16.5 | Gravity/ 0.05 | Phase transformations resulted in solution coagulating within needle and stopping flow. |
| 4 | [C₂C₁Im][OAc] | 2 (loading) | Shrimp shell extract | 28 | 16.5 | 0.05 | Electrospraying/electrospinning fibers and membranes. Large needle caused too much solution at a time |
| 5 | [C₂C₁Im][OAc] | 2 (loading) | Shrimp shell extract | 20 | 18.5 | 0.5 | Electrospinning nano and micron sized fibers. Smooth continuous fibers |

*concentration of chitin in the mixture

Viscosity measurements were taken at 30.0(1)° C. with a Cambridge Viscosity (Medford, Mass.) Viscometer, VISCO-lab 3000 and compared with the production of fibers. Approximately 2-3 mL of each solution was placed in the sample chamber. The correct sized piston corresponding to the expected viscosity range was added and the measurement was taken. The reported values were taken as an average of three measurements per reading as computed by the instrument. Table 8 compiles the concentration of the shrimp shell, the viscosity of the solution, and the ability of the solution to spin fibers. As expected the viscosity of the solution increases dramatically as more shrimp shell is dissolved. 4 and 5% solution were prepared though were extremely viscous and therefore were not measured.

TABLE 8

Viscosity and electrospinning results from a series of extracts of shrimp shells in [C₂C₁Im][OAc] and [C₂C₂im][OAc].

| Chitin loading (wt. %) | Viscosity [30° C.] (cP) | Electrospinning Results |
|---|---|---|
| 0.0 | 92 (5) | N/A |
| 1.5 in [C₂C₁Im][OAc] | 549 (3) | Fibers produced were weak and structurally degraded. |
| 2.0 in [C₂C₁Im][OAc] | 972 (3) | Fibers produced were smooth and continuous |
| 3.0 in [C₂C₁Im][OAc] | 1664 (43) | Too viscous for spinneret/needle |
| 3.0 in [C₂C₂Im][OAc] | 880 (8) | Coagulated in needle with application of charge |

Figure 2:
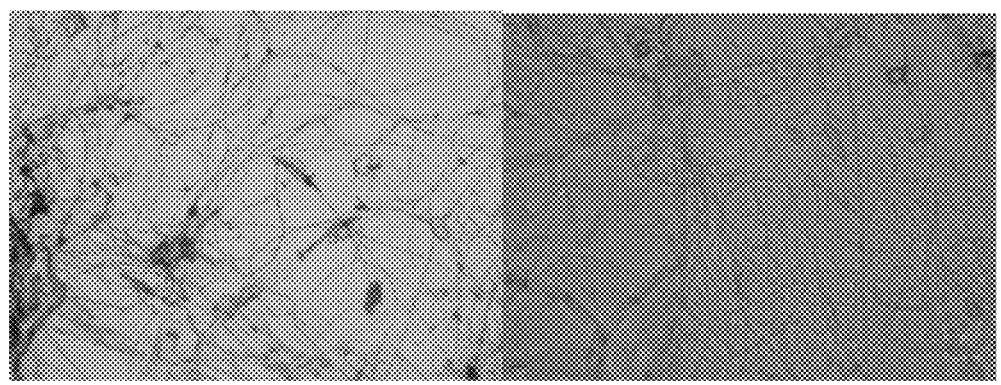
FIG. 2 is a pair of micrographs of chitin mats at 100× magnification. There is complete entanglement of the electrospun chitin fibers from a solution of 2% (w/w) shrimp shell in [$C_2$mim][OAc].
Figure 3:
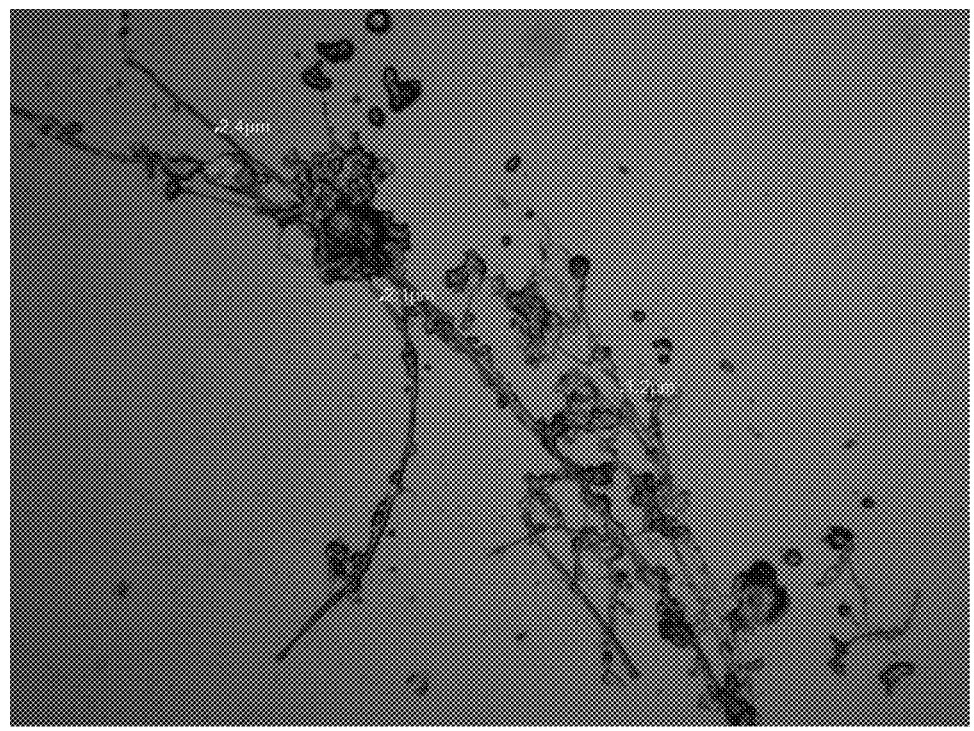
FIG. 3 is a micrograph of a non-woven mat and chitin fibers electrospun from a solution of 2% (w/w) shrimp shell in [$C_2C_2$Im]OAc.

The [C₂C₁Im][OAc] solutions were then subjected to electrospinning with the fibers collected directly into the coagulation bath with water as non-solvent. This allowed for the immediate separation of the fibers from the ionic liquid. After extended spinning, the fibers formed a non-woven mat which could be removed from the coagulation bath in one piece and washed with more solvent. The mats were stored in the water as to allow for the further removal of the ionic liquid. The mats were then characterized wet by optical microscopy and dry by transmission microscopy. An Olympus CH30 Light Microscope with attached camera was used for visualization of the fibers at 40× and 100× magnification. Emission microscopy was performed using a Hitachi S-2500 scanning electron microscope with an accelerating voltage 10 kV. FIG. 2 shows a 100× magnification of the wet chitin mat. The fibers shown are in the range of micrometers and below and are shown entangled with one another. FIG. 3 shows a similar wet chitin mat made from electrospinning from [C₂C₂Im]OAc.

Figure 4:
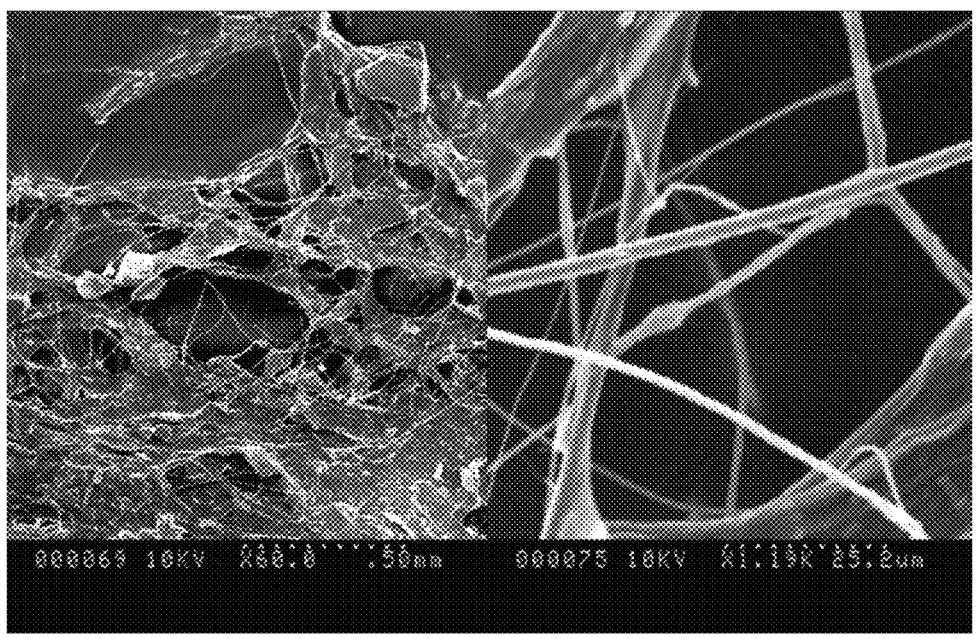
FIG. 4 is a pair of SEM images of dried fibers from the electrospun chitin mats shown in FIG. 2 at two different magnifications.
Figure 5:
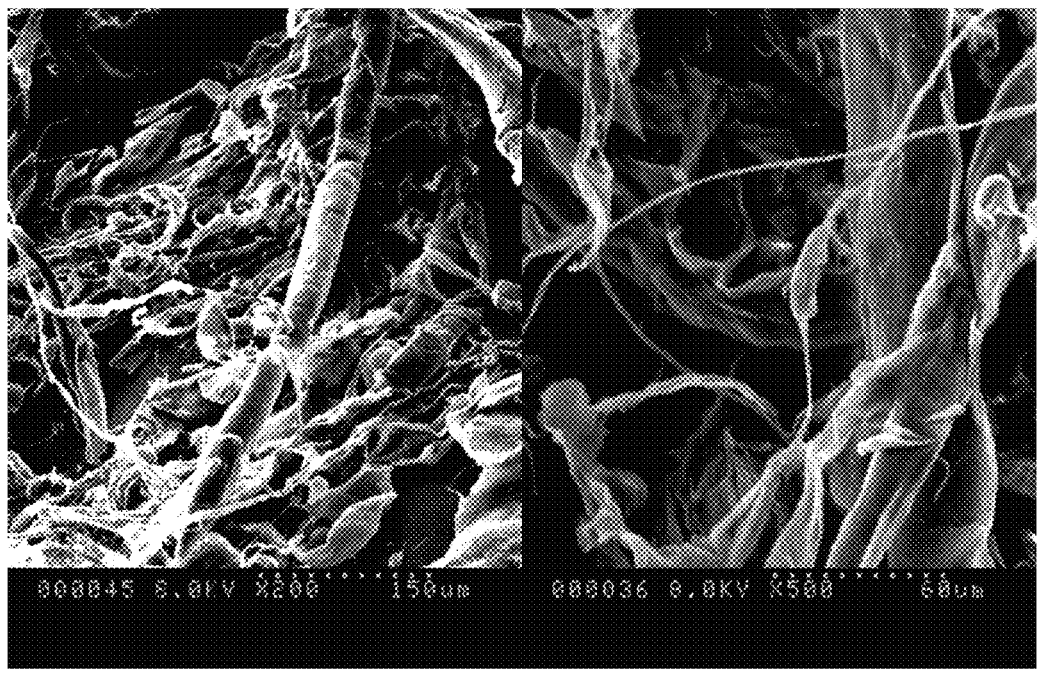
FIG. 5 shows a pair of SEM images of dried fibers from the electrospun chitin mats shown in FIG. 3 at two different magnifications.

Scanning electron microscopy (SEM) allows for the size characterization of the fibers at the micro and nano scales. FIG. 4 shows SEM images of dried fibers from the spun chitin mats at 60 times magnification in the left panel and at 1190 times magnification in the right panel. Similarly, FIG. 5 shows SEM images of dried fibers from [C₂C₂Im]OAc at 200 times magnification in the left panel and at 500 times magnification in the right panel.

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible aspects may be made of the invention without departing from the scope thereof, it is to be understood that all matter herein set forth or shown in the accompanying drawings is to be interpreted as illustrative and not in a limiting sense.

What is claimed is:

1. A method of forming chitin fibers from a chitinous biomass, comprising:
    dissolving at least a portion of the chitinous biomass in an ionic liquid to form a mixture;
    electrospinning the mixture into a non-solvent to form the chitin fibers, and
    collecting the chitin fibers from the non-solvent.

2. The method of claim 1, wherein the dissolving step comprises heating the chitinous biomass in the ionic liquid to form the mixture.

3. The method of claim 1, wherein the dissolving step comprises microwave irradiating the chitinous biomass in the ionic liquid to form the mixture.

4. The method of claim 3, wherein the microwave frequency is 2.45 GHz.

5. The method of claim 3, wherein the microwave frequency is 915 MHz.

6. The method of claim 3, wherein the microwave irradiation is continuous.

7. The method of claim 3, wherein the microwave irradiation is conducted with 1-30 second pulses for a total of 1-30 min irradiation time with stirring between the pulses.

8. The method of claim 3, wherein the microwave irradiation is conducted with 3 second pulses for a total of about 2 min irradiation time with stirring between the pulses.

9. The method of claim 1, wherein the chitinous biomass is a crustacean biomass.

10. The method of claim 9, wherein the crustacean biomass is selected from the exoskeleton of the group consisting of crab, shrimp, lobster, and crayfish.

11. The method of claim 1, wherein the chitin is present in the mixture at from about 0.5 to about 5 wt. % of the mixture.

12. The method of claim 1, wherein the chitin is present in the mixture at from about 0.5 to about 3 wt. % of the mixture.

13. The method of claim 1, further comprising maintaining the mixture at an elevated temperature before electrospinning the mixture.

14. The method of claim 1, wherein the ionic liquid contains an imidazolium cation.

15. The method of claim 1, wherein the ionic liquid is a 1-alkyl-3-methylimidazolium halide or a 1-alkyl-3-methylimidazolium $C_{1-6}$ carboxylate.

16. The method of claim 1, wherein the ionic liquid is 1-ethyl-3-methylimidazolium chloride or 1-butyl-3-methylimidazolium chloride.

17. The method of claim 1, wherein the ionic liquid is selected from the group consisting of 1-ethyl-3-methylimidazolium acetate, 1,3-diethylimidazolium acetate, and 1,3-dimethylimidazolium acetate.

18. The method of claim 1, wherein the non-solvent is water, a $C_1$-$C_4$ alcohol, ketone, or a mixture thereof.

19. The method of claim 1, further comprising recovering the ionic liquid from the non-solvent.

20. The method of claim 1, wherein the electrospinning is performed at a potential of from about 5 kV to about 45 kV.

21. The method of claim 1, wherein the electrospinning is performed at a flow rate of from about 3 mL/h to about 20 mL/h.

22. The method of claim 1, wherein the mixture has a relative viscosity of about 1 to about 1.5 at 35° C.

23. The method of claim 1, further comprising adding a processing aid to the ionic liquid.

24. The method of claim 23, wherein the chitin is present in the mixture at from about 0.5 to about 15 wt. % of the mixture.

25. The method of claim 1, further comprising dissolving the chitin fiber in an ionic liquid to form a reconstitution mixture and electrospinning the reconstitution mixture into a non-solvent to form reconstituted chitin fibers and collecting the reconstituted chitin fibers from the non-solvent.

* * * * *